US008085666B2

(12) United States Patent
Higashida

(10) Patent No.: US 8,085,666 B2
(45) Date of Patent: *Dec. 27, 2011

(54) TRANSMISSION APPARATUS AND TRANSMISSION METHOD

(75) Inventor: Masaaki Higashida, Osaka (JP)

(73) Assignee: Panasonic Corporation (JP)

( * ) Notice: Subject to any disclaimer, the term of this patent is extended or adjusted under 35 U.S.C. 154(b) by 40 days.

This patent is subject to a terminal disclaimer.

(21) Appl. No.: 12/550,026

(22) Filed: Aug. 28, 2009

(65) Prior Publication Data

US 2010/0080126 A1    Apr. 1, 2010

Related U.S. Application Data

(63) Continuation of application No. 10/486,029, filed on Feb. 6, 2004, now Pat. No. 7,606,155.

(30) Foreign Application Priority Data

Aug. 9, 2001    (JP) ................. 2001-242865

(51) Int. Cl.
*G08C 15/00*    (2006.01)
(52) U.S. Cl. ........................ 370/235; 370/474
(58) Field of Classification Search .............. 370/235, 370/252, 263, 337, 389, 394, 395.42, 395.43, 370/428, 465, 471, 474; 709/215, 235, 240, 709/251; 375/240.25–27; 710/104
See application file for complete search history.

(56) References Cited

U.S. PATENT DOCUMENTS

| | | | | |
|---|---|---|---|---|
| 4,318,174 A | * | 3/1982 | Suzuki et al. ................. | 709/215 |
| 4,445,171 A | | 4/1984 | Neches | |
| 4,845,722 A | * | 7/1989 | Kent et al. ...................... | 370/388 |
| 5,343,473 A | * | 8/1994 | Cidon et al. ................... | 370/465 |
| 5,623,490 A | * | 4/1997 | Richter et al. ................. | 370/263 |
| 5,699,521 A | * | 12/1997 | Iizuke et al. ................... | 709/240 |
| 5,784,365 A | * | 7/1998 | Ikeda ............................. | 370/337 |

(Continued)

FOREIGN PATENT DOCUMENTS

EP    1113614 A2    7/2001

(Continued)

OTHER PUBLICATIONS

Office Action for Japanese Patent Application No. 2008-270236, mailed Jun. 1, 2010, 2 pages.

(Continued)

*Primary Examiner* — Andrew Lai
(74) *Attorney, Agent, or Firm* — Sheridan Ross P.C.

(57) ABSTRACT

A transmission apparatus for stably transmitting or receiving data of high priority is provided. In the transmission apparatus of the present invention, processing of the priority packet to be transmitted and processed by priority and processing of the non-priority packet are conducted separately. At transmission side, the above-mentioned priority packet is transmitted by priority by making its average transmission interval shorter than its average generation interval, and said non-priority packet is transmitted during the transmit margin period caused by the above-mentioned processing. At receive side, in the layer of processing the receive frame as a layer lower than the layer of processing the priority packet and non-priority packet, the priority packet and the non-priority packet is sorted based on the communication protocol header of the receive packet stored in the receive frame, and processing of the priority packet and that of the non-priority packet are conducted separately.

14 Claims, 11 Drawing Sheets

U.S. PATENT DOCUMENTS

| | | | |
|---|---|---|---|
| 5,796,957 A * | 8/1998 | Yamamoto et al. | 709/251 |
| 5,812,534 A | 9/1998 | Davis et al. | |
| 5,815,503 A * | 9/1998 | Li | 370/471 |
| 5,956,721 A | 9/1999 | Douceur et al. | |
| 6,327,625 B1 * | 12/2001 | Wang et al. | 709/235 |
| 6,408,011 B1 | 6/2002 | Nakatsugawa | |
| 6,470,029 B1 * | 10/2002 | Shimizu | 370/468 |
| 6,681,139 B1 | 1/2004 | Ohashi et al. | |
| 6,731,686 B1 | 5/2004 | Sudharsanan et al. | |
| 6,760,328 B1 * | 7/2004 | Ofek | 370/389 |
| 6,795,435 B1 * | 9/2004 | Jouppi et al. | 370/394 |
| 6,826,233 B1 * | 11/2004 | Oosawa | 375/240.27 |
| 6,891,799 B1 | 5/2005 | Hagai et al. | |
| 7,606,155 B2 | 10/2009 | Hagashida | |
| 2003/0012213 A1 | 1/2003 | Karighattam et al. | |

FOREIGN PATENT DOCUMENTS

| | | |
|---|---|---|
| JP | 2142238 | 5/1990 |
| JP | 3-235448 | 10/1991 |
| JP | 3-267847 | 11/1991 |
| JP | 4361440 | 12/1992 |
| JP | 05-347650 | 12/1993 |
| JP | 7273789 | 10/1995 |
| JP | 9-261230 | 10/1997 |
| JP | 10-126818 | 5/1998 |
| JP | 11-088404 | 3/1999 |
| JP | 11-127182 | 5/1999 |
| JP | 2000-029849 | 1/2000 |
| JP | 2000-059463 A | 2/2000 |
| JP | 2000-078191 | 3/2000 |
| JP | 2000124922 A | 4/2000 |
| JP | 2000-228676 | 8/2000 |
| JP | 2001-189713 | 7/2001 |
| JP | 2002-185942 | 6/2002 |
| WO | WO00-77968 A1 | 12/2000 |
| WO | WO01/40960 A1 | 6/2001 |

OTHER PUBLICATIONS

Supplemental European Search Report for Application No. EP 02753236, dated Dec. 6, 2005.

Supplementary Partial European Search Report and Annex to the European Search Report for Application No. EP 02753236, dated Sep. 26, 2005.

International Search Report for Application No. PCT/JP02/07993, dated Mar. 4, 2003.

Restriction Requirement for U.S. Appl. No. 10/486,029, dated Jul. 3, 2007.

Non-Final Office Action for U.S. Appl. No. 10/486,029, dated Oct. 9, 2007.

Final Office Action for U.S. Appl. No. 10/486,029, dated Apr. 25, 2008.

Non-Final Office Action for U.S. Appl. No. 10/486,029, dated Nov. 12, 2008.

Notice of Allowance for U.S. Appl. No. 10/486,026, dated May 29, 2009.

* cited by examiner

TRANSMISSION APPARATUS AND TRANSMISSION METHOD

RELATED APPLICATIONS

This application is a continuation of U.S. patent application Ser. No. 10/486,029, now U.S. Pat. No. 7,606,155, filed Feb. 6, 2004.

TECHNICAL FIELD

The present invention relates to a transmission apparatus and a transmission method that handle priority packets to be transmitted or received by priority (priority packets) and other non-priority packets (non-priority packets).

BACKGROUND ART

For transmission of data having real-time characteristic such as video signal through a communication network including ethernet, it is generally performed to install a board for video signal processing (video card) and a network interface card into a PCI (Peripheral Components Interconnect) bus of personal computer and to transmit packets according to the network protocol such as Internet Protocol (hereinafter referred to as "IP"), User Datagram Protocol (hereinafter referred to as "UDP") or Transmission Control Protocol (hereinafter referred to as "TCP").

FIG. 11 is a block diagram of a prior art transmission system in which video signals are transmitted through ethernet. FIG. 11 shows an ethernet network interface card (hereinafter referred to as "NIC") 500, a video card 501, a PCI bus 502, a CPU 503 and a memory 504.

The NIC 500 has a PCI interface part (hereinafter referred as to "PCI I/F part") 520, an ethernet processing part 521 and a physical layer processing part 522. The video card 501 has a video signal processing part 510 and a PCI I/F part 511.

An input video signal is processed (for example, compressed) in the video signal processing part 510 and stored in the memory 504 through the PCI I/F part 511 and the PCI bus 502. The transmission on the PCI bus 502 is performed by the interruption of the video card 501 to the CPU 503 for DMA (Direct Memory Access) transfer.

Then, for stream transmission, the video data stored in the main memory 504 is separated every predetermined length by software processing in the CPU 503 (each separated video data is hereinafter referred to as a "video payload"), and each video payload is assigned a number for identification and then written into the main memory 504 again (it is hereinafter referred to as a "video packet").

The CPU 503 reads out the video packet from the memory 504, performs UDP/IP processing and ethernet frame processing and writes the generated ethernet frame into the memory 504 again by software processing. Generally, for stream transmission, UDP is used for processing in the fourth layer of an OSI model and IP is used for processing in the third layer of the OSI model (the fourth layer and the third layer are hereinafter referred to as "UDP/IP", collectively). The ethernet frame, that is subject to UDP/IP protocol processing and ethernet frame processing of the second layer, is stored in the memory 504.

The OSI model has a seven layer architecture consisting of the first layer as a physical layer, the second layer as a data link layer, the third layer as a network layer, the fourth layer as a transport layer, the fifth layer as a session layer, the sixth layer as a presentation layer and the seventh layer as an application layer.

Next, the CPU 503 notifies the NIC 500 that there is an ethernet frame to be transmitted in the memory 504. The NIC 500 interrupts the CPU 503 and captures the ethernet frame via the PCI bus 502 by DMA transfer of the PCI interface 520. The ethernet processing part 521 performs additional processing of the ethernet frame and sends the ethernet frame to the physical processing part 522. The ethernet frame in the final form is transmitted on ethernet.

At the time of receipt, when the NIC 500 receives an ethernet frame via the physical layer processing part 522 and the ethernet processing part 521, it interrupts the CPU 503 and writes the received ethernet frame into the memory 504 via the PCI bus 502 by DMA transfer of the PCI interface 520. Next, the CPU 503 reads out the ethernet frame from the memory 504, performs ethernet frame processing and UDP/IP processing, detects the number assigned to the video payload for identification at the time of transmission to assure ordinality and, after that, stores the generated video packet in the memory 504 again by software processing.

Next, the CPU 503 notifies the video card 501 that there is a stored video packet. The PCI interface 511 of the video card 501 interrupts the CPU 503 and captures the video packet via the PCI bus by DMA transfer. The video card 501 extracts video data and then performs processing such as expansion to output video.

The above-mentioned example is that of stream transmission of UDP/IP. File transfer by TCP/IP requires similar software processing. In the case of TCP/IP, flow control processing of TCP in addition to the above-mentioned processing is performed by software.

As mentioned above, protocol processing relating to transfer, part of processing such as video transmission and interrupt handling for memory copy and PCI bus transfer depend on software. The conventional example by performing the above-mentioned software processing is hereinafter referred to as a first conventional example.

As another conventional example, there is a technique disclosed in Unexamined Patent Publication No. 2000-59643 (hereinafter referred to as a second conventional example).

In the second conventional example, a dedicated processing means for generating real-time data packets (protocol dedicated processing means 26 in FIG. 2 of the second conventional example) is provided and in transmitting a large volume of contiguous real-time data such as moving pictures, high-speed transmission can be achieved. Moreover, in the second conventional example, a function of limiting transmission rate of real-time data (rate control means 23 in FIG. 2 of the second conventional example) is also provided.

Another conventional example is IEEE 1394 (hereinafter referred to as a third conventional example). In the third conventional example, transmission time is divided into a time zone during which isochronous data is transmitted (hereinafter referred to as an "isochronous zone") and a time zone during which non-isochronous data is transmitted (hereinafter referred to as an "non-isochronous zone"). Data requiring real-time characteristic such as video (hereinafter referred to as "real-time data") is transferred in the isochronous zone. Ordinary data for control or setting of equipment requiring no real-time characteristic is transferred in the non-isochronous zone. This enables transfer of real-time data and ordinary data.

As another conventional example, there is a technique disclosed in Unexamined Patent Publication No. 2002-185942 (hereinafter referred to as a fourth conventional example). The fourth conventional example relates to only transmission terminal (server) of video data.

The first feature of the fourth conventional example is that display interval of the video frame is used as a reference of transmitting the video data packet. However, the conventional example fails to specifically disclose how to perform control by utilizing the frame display interval.

The second feature is to transmit the TCI/IP packet only when the UDP/IP packet formed of video data is not transmitted. In addition, the conventional example discloses that the UDP/IP packet is processed by hardware and the TCI/IP packet is processed by software.

However, the above-mentioned conventional configuration has the following problems.

In the first conventional example, all of the ethernet frame processing and protocol processing of IP and UDP are performed by the CPU and further part of video signal processing is also performed by the CPU. For that reason, there is a problem that processing cannot keep up with tasks for stream transmission at high-bit rate. Moreover, as the PCI bus is used as a common bus, real-time data with higher priority to be transmitted or received and data with lower priority exist together, thereby causing a problem that real-time processing is too late.

These problems result from the following two reasons. Firstly, as data rate for stream transmission of video data is essentially very high, the CPU can exceed its performance limit. In transmitting the ethernet frame and the video packet on the PCI bus, the method called as multi-thread (multi-process) in terms of software, in which multiple transactions are performed concurrently in appearance, is adopted. In fact, these transactions are performed by time-sharing of the CPU. Secondly, due to overhead at the switching of thread (or referred to as task or process), CPU performance is lowered substantially, and due to memory copy repeated many times at processing, CPU throughput allocated to video transmission is limited.

The above-mentioned switching of thread depends on software of the operating system (hereinafter referred to as "OS") and users cannot control processing completely.

Specifically, in the first conventional example, there causes a problem that the speed at which the CPU generates the ethernet frame cannot keep up with the data rate of the data to be transmitted (video data in this example) at transmission of the NIC and therefore the untransmitted video packet occurs, resulting in broken video image. Further, there is another problem that even when the ethernet frame can be generated at required data rate, transfer of the ethernet frame from the memory to the NIC cannot be completed in time.

Further, there is another problem that so-called shaping processing in which the video packet need to be transmitted at regular timings depends on the CPU (depends on software with variation in processing timing), so that accurate shaping cannot be achieved.

Furthermore, as decision on transmission proportion between high-priority data such as video signal and low-priority data such as management information also depends on the CPU (depends on software), the high-priority data is not necessarily transmitted by priority.

Moreover, at the time of receipt of the NIC, there is a possibility that the CPU cannot carry out switching to the thread for processing the receive frame and capture the incoming ethernet frame into the memory in time, thereby missing data in the NIC (abandonment of ethernet frame). Althernatively, even when the ethernet frame can be taken into the memory, the CPU can take too long for protocol processing, thereby failing to transmit data in real time.

Moreover, as another problem, since task management depends on the OS, a high priority is not necessarily given to processing of the high-priority data such as video signal over the low-priority data such as management information.

Use of high-performance CPU can increase its throughput, but it is not a fundamental solution to these problems. In addition, the high-performance CPU consumes a large volume of electric power. In the case of insufficient heat radiation especially in equipment with built-in CPU, the equipment can proper improper operations. The high-performance CPU also has a problem of being expensive.

These problems are aggravated in the case where the CPU performs processing of additional information such as management information in addition to transmission of video data.

The problems on network processing of the above-mentioned problems relating to the CPU essentially arise from the fact that network processing in the general operating systems is performed in sub-layers of the OSI architecture model in a sequential order.

The processing will be described specifically by taking the OSI model (seven layer architecture) that uses the physical layer as the first layer, ethernet as the second layer, internet protocol (IP) as the third layer and UDP as the fourth layer, as an example. At the receive terminal of ethernet, the physical layer as the first layer receives an ethernet frame and performs termination processing. Next, ethernet (second layer) performs termination processing of the ethernet frame, extracts an IP packet and sends it to the internet protocol (third layer). The internet protocol (third layer) processes the IP packet, extracts a UDP packet and sends it the fourth layer. In the fourth layer, termination processing of the UDP packet is performed.

Such processing in the order of layers causes processing overhead, imposing a burden on the CPU (software processing).

The above-mentioned problems occur at the transmission side of ethernet.

In the second conventional example, burden on the processor is reduced by generating the real-time data packet by use of the dedicated processing means. However, it discloses no method of controlling the generated real-time data packet and other packet generated in the processor. In the case of controlling these packets in the conventional method, the following problems arise.

The first problem is that the real-time data packet is not necessarily transmitted by priority. Specifically, in the case where a large number of non-real time data packets are generated in the second conventional example, transmission of the real-time data packets is limited, resulting in that real-time characteristic cannot be ensured.

As the second problem, it cannot be ensured that non-real time data is transmitted without system failure while giving a priority to transmission of real-time data. Non-real time data includes ARP (Address Resolution Protocol) data described as follows, SNMP (Simple Network Management Protocol) data for system management and data for confirming conduction between applications. With respect to the second problem, in the second conventional example, bit rate of real-time data can be lowered by the rate control means 23 in FIG. 2. In the second conventional example, however, no method of controlling transmission of real-time data and other data is disclosed. In other words, the second conventional example has a problem that quality of real-time data must be lowered to ensure transmission of the other data.

The second conventional example has the following third problem. In the case where transmission is performed on ethernet by using internet protocol (IP), ARP processing in which MAC (Media Access Control) address of the ethernet to be transmitted is acquired based on the IP address of destination is carried out. As ARP processing is performed through two-way communication, it is suitable to use a processor. However, in the second conventional example, there is no method of notifying results of ARP processing from the protocol general-purpose processing means 25 to the parameter setting means 29 in FIG. 2 and finally setting the MAC address in the header generating means 262. Therefore, the second conventional example has a problem that real-time data can be transmitted only to the fixed address hold by the parameter setting means 29 in advance. For that reason, there also causes another problem that port number cannot be set flexibly, for example, in the case of negotiating the port number of upper UDP protocol, not limited to ARP processing.

In the third conventional example, transmission zone of real-time data is previously determined according to time allocation. Therefore, in the case where the amount of real-time data to be transmitted in the isochronous zone is smaller and the amount of ordinary data to be transmitted is larger than the respective allocated transfer capability, the transmission zone is wasted. Similar problem also arises in the case where the amount of ordinary data to be transmitted in the non-isochronous zone is smaller and the amount of real-time data to be transmitted in the isochronous zone is larger than the respective allocated transfer capability. That is, the third conventional example has a problem that the proportion between real-time data and ordinary data cannot be changed flexibly.

The third conventional example has another problem that when real-time data to be transmitted generates during the time allocated to the non-isochronous zone, data transmission has to be postponed until the next isochronous zone, causing delay in transmission. Many applications are affected seriously by the delay of real-time data. As these applications require transmission of real-time data with short delay, it is a major problem. This delay problem occurs in transmission of ordinary data in the same way. When ordinary data to be transferred generates in the isochronous zone, data transmission has to be postponed until the next non-isochronous zone, causing a similar delay problem.

In the fourth conventional example, display interval of the video frame is used as a transmission reference of the video data packet. In this case, however, when the time necessary for processing of the video data exceeds the time interval of the video frame even if only slightly, the problem such as loss of real-time characteristic occurs, thereby causing break in image. Therefore, using the video frame as reference means control based on the extreme broad reference, causing the following problem.

For example, assuming that delay in transmission occurs at some midpoint in the video frame and it is sought to recover delay by transmitting data remaining in the final part of the video frame in burst fashion. However, if the delay has already become unrecoverable at the point when burst transfer is started, transmission of one frame cannot be terminated within its video frame time (the time period during which processing must be finished to maintain real-time characteristic), causing a break in image. This problem is apt to occur especially when video data and non-video data are transmitted together.

In the case where the transmission apparatus of the fourth conventional example transmits video data and non-video data together, control is performed so as to transmit non-video data (TCP/IP packet) only when the UDP/IP packet consisting of video data is not transmitted. In the fourth conventional example, a problem arises, for example, in the following case.

For example, assuming that transmission of the TCP/IP packet with very long packet length is started at the time when the UDP/IP packet is not transmitted. In this case, even if a short UDP/IP packet becomes prepared for transmission before transmission of the TCP/IP packet is completed, transmission of the UDP/IP packet cannot be started until termination of transmission of the TCP/IP packet. As a result, transmission of the UDP/IP packet is delayed, thereby to cause a problem of damaging real-time characteristic of the video data.

In an extreme case, when the UDP/IP packet becomes prepared for transmission concurrently with start of transmission of the TCP/IP packet, the UDP/IP packet is in a waiting state throughout the period required to transmit the TCP/IP packet.

Essentially, this problem results from the fact that transmission priority of video data is not enough higher than that of non-video data in the fourth conventional example. As a result, video data may be awaiting transmission according to the circumstances.

Furthermore, the fourth conventional example has the following problem in the case where time-out period is set for the non-video packet (TCP/IP packet) as well.

For example, in the fourth conventional example, when there is a large volume of video data to be transmitted, non-transmission period of video data (UDP/IP packet) is not generated and therefore, transmission of non-video data (TCP/IP packet) is delayed extremely. For that reason, the application that has tried to transmit the TCP/IP packet times out, thereby causing failures in stable system operation.

Essentially, the above-mentioned problem arises from the simple algorithm of transmitting non-video data (TCP/IP packet) only when the UDP/IP packet is not transmitted.

DISCLOSURE OF INVENTION

To solve the above-mentioned problems, a transmission apparatus according to the present invention from one aspect comprises: a priority packet generating part of generating a priority packet from priority data to be transmitted by priority; a non-priority packet processing part of generating a non-priority packet having a lower transmission priority than the above-mentioned priority packet; a transmit packet control part of deciding transmission timing of the above-mentioned priority packet and the above-mentioned non-priority packet and a transmit frame processing part of performing transmission processing of the above-mentioned priority packet and the above-mentioned non-priority packet, wherein the above-mentioned transmit packet control part permits transmission of the above-mentioned non-priority packet during a transmit margin period of the above-mentioned priority packet.

More preferably, the above-mentioned non-priority packet processing part comprises a transmit packet selecting part, a priority packet buffer and a non-priority packet buffer, and outputs a non-priority packet transmit request signal to the above-mentioned transmit packet selecting part in the case where the above-mentioned non-priority packet buffer holds the above-mentioned non-priority packet to be transmitted, and the above-mentioned transmit packet selecting part permits transmission of the above-mentioned non-priority packet during the transmit margin period of the above-mentioned priority packet.

More preferably, the above-mentioned transmit packet control part defines the period during which real-time characteristic of the above-mentioned priority data is impaired as the above-mentioned transmit margin period.

More preferably, the above-mentioned transmit packet control part transmits the above-mentioned priority packet at a shorter transmission interval than average transmission interval of the above-mentioned priority packet and defines the surplus time caused by the above-mentioned processing as the above-mentioned transmit margin period.

More preferably, the above-mentioned transmit packet selecting part permits the above-mentioned non-priority packet buffer to transmit the above-mentioned non-priority packet in the case where there is not the above-mentioned priority packet to be transmitted in the above-mentioned priority packet buffer.

More preferably, the above-mentioned transmit packet selecting part permits the above-mentioned non-priority packet buffer to transmit the above-mentioned non-priority packet in the case where there is not the above-mentioned priority packet to be transmitted in the above-mentioned priority packet buffer and the above-mentioned priority packet is not being written into the above-mentioned priority packet buffer.

More preferably, the above-mentioned transmit packet control part permits transmission of the above-mentioned non-priority packet within a predetermined time after request to transmit the above-mentioned non-priority packet.

Further, a transmission method according to the present invention from another aspect distinguishes a priority packet to be transmitted by priority from a non-priority packet having a lower transmission priority than the above-mentioned priority packet and transmits the above-mentioned non-priority packet during the transmit margin period of the above-mentioned priority packet.

More preferably, the above-mentioned non-priority packet is transmitted during the transmit margin period as the time during which real-time characteristic of the above-mentioned priority packet is not impaired.

More preferably, the surplus time caused by making the transmission interval of the above-mentioned priority packet shorter than average transmission interval of the above-mentioned priority packet is defined as the above-mentioned transmit margin period.

More preferably, the time during which there is not the above-mentioned priority packet to be transmitted is defined as the above-mentioned transmit margin period.

More preferably, the time during which there is not the above-mentioned priority packet to be transmitted and the priority packet to be transmitted is not in preparation for transmission is defined as the above-mentioned transmit margin period.

More preferably, transmission of at least one non-priority packet is ensured within a predetermined time.

Further, a transmission apparatus according to the present invention from another aspect comprises a priority packet generating part of generating a priority packet from priority data transmitted by priority; a non-priority packet processing part of processing a non-priority packet having a lower transmission priority than the above-mentioned priority packet; a transmit packet control part of deciding transmission timing of the above-mentioned priority packet and the above-mentioned non-priority packet; a transmit frame processing part of performing transmission processing of the above-mentioned priority packet and the above-mentioned non-priority packet; a receive frame processing part of performing receipt processing of a receive frame received from a network; and a receive packet processing part of sorting a receive packet and transferring the above-mentioned non-priority packet to the above-mentioned non-priority packet processing part; and in the above-mentioned non-priority packet processing part acquires header information of the above-mentioned priority packet from the above-mentioned receive packet and sets the above-mentioned header information in the above-mentioned priority packet generating part.

More preferably, the above-mentioned header information is information that varies depending on destination address.

More preferably, processing of acquiring the above-mentioned header information is processing of obtaining a physical address (MAC address) of ethernet from IP address.

Further, a transmission method according to the present invention from another aspect comprises: a step of transmitting a priority packet to be transmitted by priority; and steps of transmitting and receiving a non-priority packet having a lower transmission priority than the above-mentioned priority packet; and in the steps of transmitting and receiving the above-mentioned non-priority packet, header information of the above-mentioned priority packet is acquired and in the step of transmitting the above-mentioned priority packet, header information of the above-mentioned priority packet is set at the above-mentioned priority packet and transmitted.

More preferably, the above-mentioned header information is information that varies depending on destination address.

More preferably, processing of acquiring the above-mentioned header information is processing of obtaining a physical address (MAC address) of ethernet from IP address.

A transmission apparatus according to the present invention from another aspect comprises a receive frame processing part of receiving a priority packet to be processed by priority and a non-priority packet having a lower processing priority than the above-mentioned priority packet and performing receipt processing of a receive frame; and a receive packet sorting part of sorting the receive packet stored in the above-mentioned receive frame processing part into the above-mentioned priority packet and the above-mentioned non-priority packet by inspecting a communication protocol header stored in the above-mentioned receive packet.

More preferably, the above-mentioned receive packet sorting part sorts the above-mentioned receive packet into the above-mentioned priority packet and the above-mentioned non-priority packet based on at least information by type of communication protocol stored in the above-mentioned receive packet.

More preferably, the above-mentioned receive packet sorting part sorts the above-mentioned receive packet into the above-mentioned priority packet and the above-mentioned non-priority packet by inspecting at least a port number stored in the above-mentioned receive packet.

More preferably, the above-mentioned receive packet sorting part sorts the above-mentioned receive packet into the above-mentioned priority packet and the above-mentioned non-priority packet by inspecting at least a flow label stored in the above-mentioned receive packet.

More preferably, the above-mentioned receive packet sorting part inspects a protocol layer (protocol layer 2) upper than a protocol layer (protocol layer 1) constituting the above-mentioned receive packet, the above-mentioned priority packet is subject to termination processing of the above-mentioned protocol layer 2, and the above-mentioned non-priority packet is transferred as it is in the above-mentioned protocol layer 1 to the non-priority packet processing part.

More preferably, the above-mentioned receive packet sorting part inspects communication protocol headers of different layers at the same time.

Further, a transmission method according to the present invention from another aspect comprises: a receiving step of receiving a receive packet consisting of a priority packet to be transmitted by priority and a non-priority packet having a lower processing priority than the above-mentioned priority packet; a sorting step of sorting the above-mentioned receive packet into the above-mentioned priority packet and the above-mentioned non-priority packet by inspecting a communication protocol header stored in the above-mentioned receive packet; and a processing step of processing the above-mentioned priority packet and the above-mentioned non-priority packet separately.

More preferably, in the above-mentioned sorting step, the above-mentioned priority packet and the above-mentioned non-priority packet are separated by inspecting at least communication protocol type of the above-mentioned communication protocol header.

More preferably, in the above-mentioned sorting step, the above-mentioned priority packet and the above-mentioned non-priority packet are separated by inspecting at least a port number of the above-mentioned communication protocol header.

More preferably, in the above-mentioned sorting step, the above-mentioned priority packet and the above-mentioned non-priority packet are separated by inspecting at least a flow label of the above-mentioned communication protocol header.

More preferably, in the above-mentioned sorting step, a protocol layer (protocol layer 2) upper than a protocol layer (protocol layer 1) constituting the above-mentioned receive packet is inspected, the above-mentioned priority packet is subject to termination processing of the above-mentioned protocol layer 2, and the above-mentioned non-priority packet is transferred as it is in the above-mentioned protocol layer 1 to the next step.

More preferably, in the sorting step, communication protocol headers of different layers are inspected at the same time.

A transmission apparatus according to the present invention from another aspect comprises: a receive frame processing part of receiving a priority packet to be processed by priority and a non-priority packet having a lower processing priority than the above-mentioned priority packet; and plural defragment processing parts that contain a first defragment processing part of performing defragment processing of the above-mentioned priority packet and a second defragment processing part of performing defragment processing of the above-mentioned non-priority packet.

More preferably, the transmission apparatus further comprises a receive packet sorting part of sorting the receive packet stored in the above-mentioned receive frame processing part into the above-mentioned priority packet and the above-mentioned no-priority packet, and the above-mentioned non-priority packet processing part of processing the above-mentioned non-priority packet includes the above-mentioned second defragment processing part.

More preferably, in the case where the above-mentioned receive packet is not fragmented, the above-mentioned receive packet sorting part determines whether the above-mentioned receive packet is the above-mentioned priority packet or the above-mentioned non-priority packet and outputs it separately; and in the case where the above-mentioned receive packet is fragmented, when the above-mentioned receive packet can be determined to be the above-mentioned non-priority packet, the above-mentioned receive packet sorting part transfers the above-mentioned receive packet to the above-mentioned non-priority packet processing part and stores the identifier of the above-mentioned receive packet, and when the above-mentioned receive packet can be determined to be the above-mentioned priority packet, the above-mentioned receive packet sorting part transfers the above-mentioned receive packet to the above-mentioned first defragment processing part and stores the identifier of the above-mentioned receive packet, and when the above-mentioned receive packet cannot be determined to be the above-mentioned priority packet or the above-mentioned non-priority packet according to information of the above-mentioned receive packet, the above-mentioned receive packet sorting part determines it by using the above-mentioned identifier and when it cannot be determined even if the above-mentioned identifier is used, transfers the above-mentioned receive packet to the above-mentioned first defragment processing part; the above-mentioned first defragment processing part performs defragment processing of at least priority packet and when the above-mentioned receive packet is determined to be the above-mentioned non-priority packet, transfers all packets relating to the above-mentioned receive packet to the above-mentioned non-priority packet processing part; and the above-mentioned non-priority packet processing part performs defragment processing of the above-mentioned non-priority packet.

A transmission apparatus according to the present invention from another aspect comprises: a priority packet generating part of generating a priority packet by adding an error correction code to priority data to be transmitted by priority; a non-priority packet processing part of generating a non-priority packet having a lower transmission priority than the above-mentioned priority packet; a transmit packet control part of deciding transmission timing of the above-mentioned priority packet and the above-mentioned non-priority packet; a transmit frame processing part of performing transmission processing of the above-mentioned priority packet and the above-mentioned non-priority packet; and a receive frame processing part of detecting transmission failure from network and notifying it to the above-mentioned transmit frame processing part, and, in the case where transmission of the above-mentioned priority packet is delayed due to the above-mentioned transmission failure, the above-mentioned transmit packet control part thins out and transmits the above-mentioned priority packet in which the above-mentioned error correction code is stored.

More preferably, the above-mentioned transmission failure is a transmit suspension request from network.

More preferably, the above-mentioned transmit packet control part suspends transmission of the packet within a predetermined period at the time of detection of the above-mentioned transmission failure.

More preferably, the above-mentioned transmission failure is detection of collision between packets in network.

More preferably, the above-mentioned transmit packet control part retransmits the packet, the above-mentioned transmission failure of which is detected.

Further, a transmission method according to the present invention from another aspect comprises: a priority packet transmitting step of transmitting priority packet by adding an error correction code to priority data to be transmitted by priority and transmitting it as a priority packet; and a non-priority packet transmitting step of transmitting non-priority packet by transmitting a packet having a lower transmission priority than the above-mentioned priority packet as a non-priority packet; and, in the case where transmission failure occurs on a transmission path, in the above-mentioned priority packet transmitting step, the above-mentioned priority packet in which the above-mentioned error correction code is stored is thinned out and transmitted.

More preferably, the above-mentioned transmission failure is a transmit suspension request from network.

More preferably, the above-mentioned transmission failure is detection of collision between packets in network.

A transmission apparatus according to the present invention from another aspect comprises: a receive frame processing part of receiving a priority packet which stores priority data to be processed by priority and a non-priority packet having a lower processing priority than the above-mentioned priority packet and performing receipt processing of a receive frame; a receive packet sorting part of the receive packet stored in the above-mentioned receive frame into the above-mentioned priority packet and the above-mentioned non-priority packet; a defragment processing part of performing defragment processing of at least the above-mentioned priority packet; and a priority data processing monitoring part of issuing a priority data processing completion notice that notifies completion of processing of the above-mentioned priority data, and the above-mentioned defragment processing part finishes defragment processing of the above-mentioned priority packet needed to have been processed by the time of receipt of the above-mentioned priority data processing completion notice.

More preferably, the above-mentioned priority data processing completion notice is generated based on identification information of the communication protocol header.

More preferably, in the case where the above-mentioned receive frame processing part, the above-mentioned receive packet sorting part or the above-mentioned defragment processing part receives the above-mentioned priority packet needed to have been processed by the time of receipt of the above-mentioned priority data processing completion notice, it abandons the priority packet.

Further, a transmission method according to the present invention from another aspect comprises: a receiving step of receiving a priority packet that stores priority data be processed by priority therein and a non-priority packet having a lower processing priority than the above-mentioned priority packet; and a defragment processing finishing step of finishing defragment processing of the above-mentioned priority packet needed to have been processed by the time of completion of the processing, in the case where processing of the above-mentioned priority data is finished.

More preferably, the transmission method further comprises an abandoning step, wherein in the case where the above-mentioned priority packet needed to have been processed by the time of completion of the processing is received, the priority packet is abandoned.

BEST MODE FOR CARRYING OUT THE INVENTION

Firstly, the present invention will be described with reference to the entire system.

Figure 2:
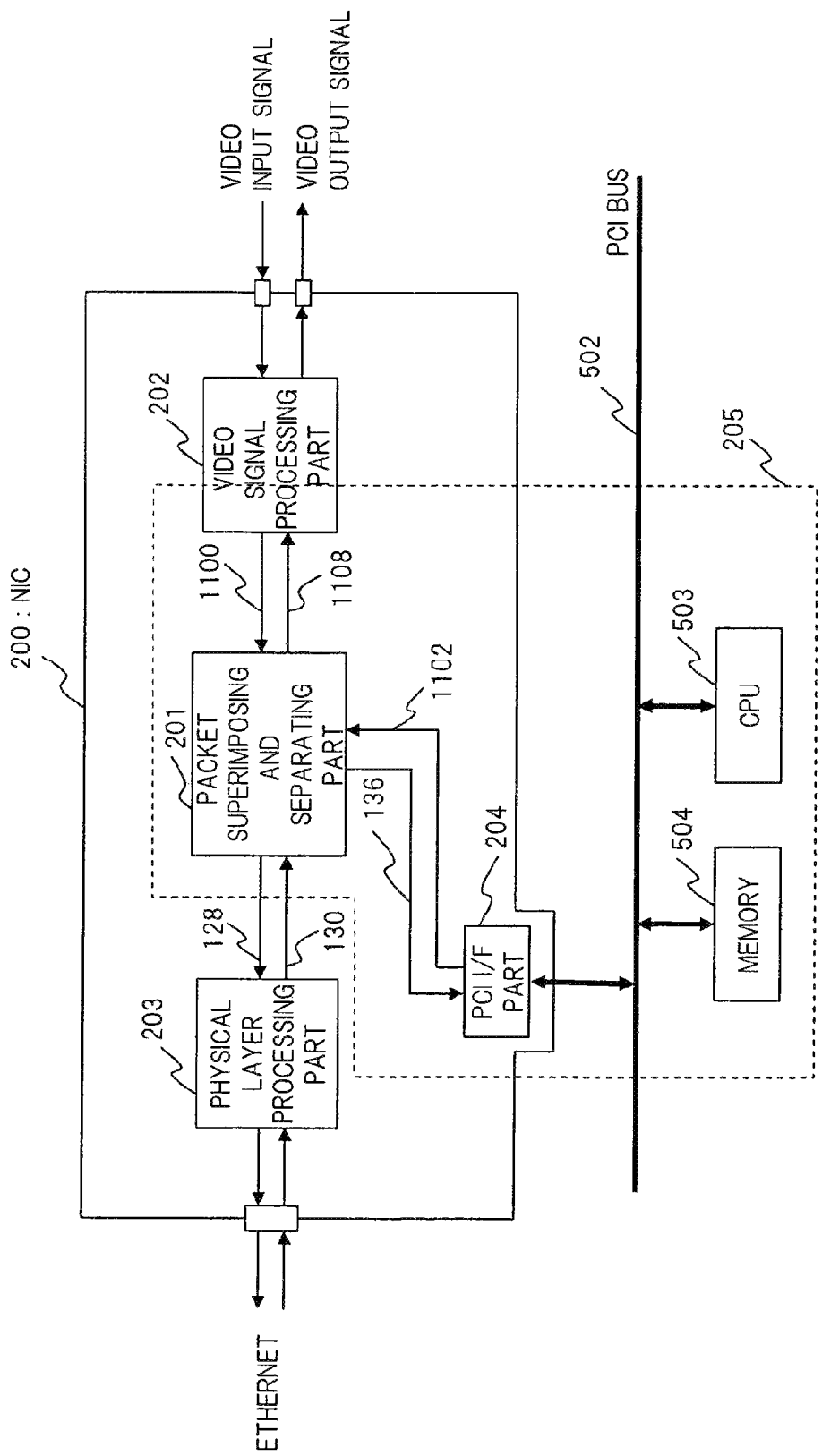
FIG. 2 is a block diagram of an entire transmission system in accordance with an embodiment of the present invention.
Figure 11:
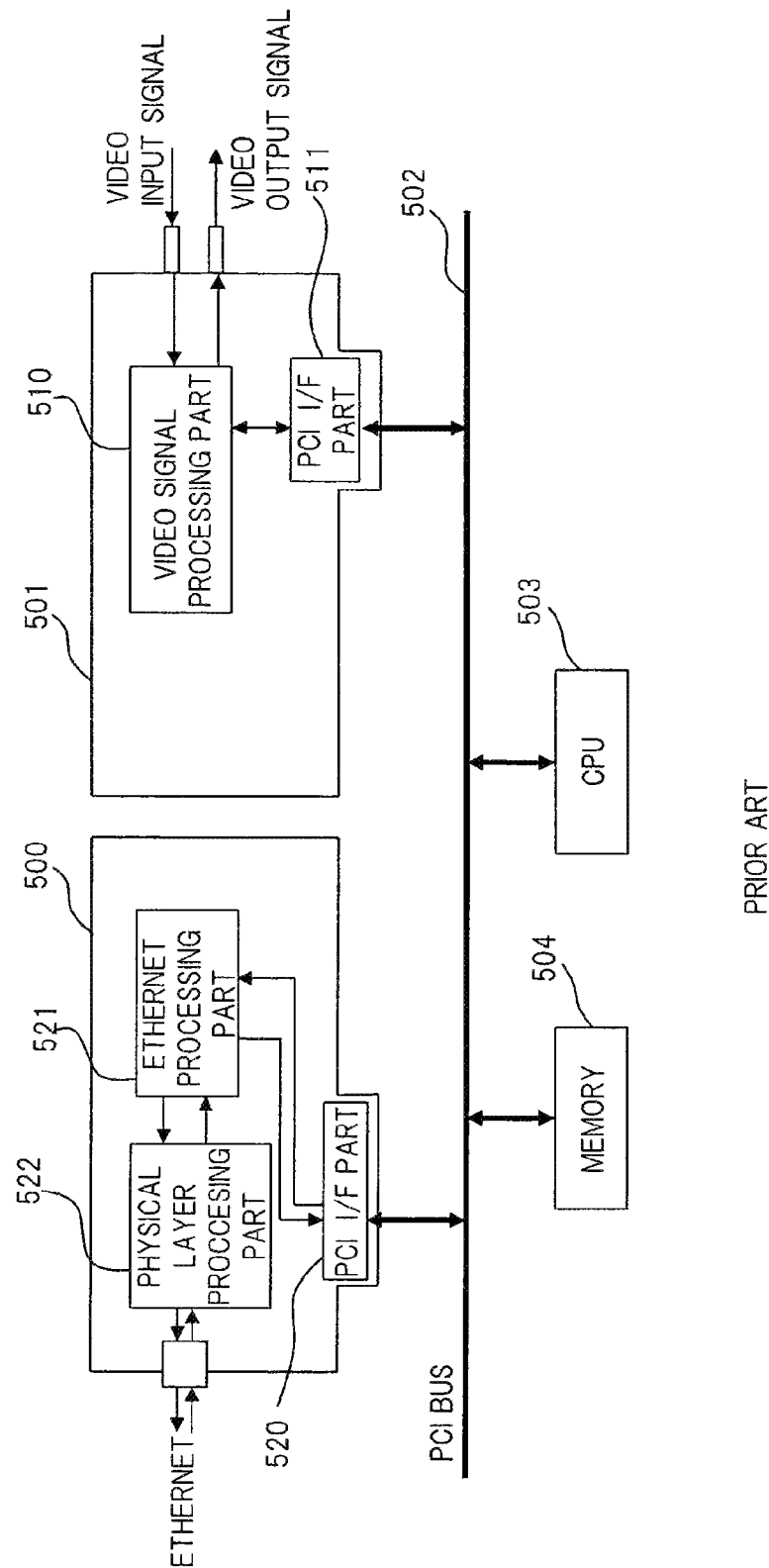
FIG. 11 is a block diagram showing the configuration of a prior art transmission apparatus in which a video signal is transmitted through ethernet.

FIG. 2 is a block diagram of the entire system to which the present invention applies. FIG. 2 illustrates a video input/output signal as priority data to be processed by priority. Reference numeral 200 denotes an NIC. The NIC 200 has a packet superimposing and separating part 201 for superimposing a priority packet and a non-priority packet and separating them from each other, a video signal processing part 202, a physical layer processing part 203 for processing a physical layer of ethernet and a PCI I/F part 204. The PCI bus 502, memory 504 and CPU 503 are identical to those of FIG. 11.

In the present embodiment, a video input signal processed (for example, image compression processing) in the video signal processing part 202 is input to the packet superimposing and separating part 201 as priority data.

An ethernet frame (video packet) received through ethernet is input to the video signal processing part 202 via the packet superimposing and separating part 201 as priority data. Hereinafter, the packet generated from the priority data is referred to as "priority packet".

On the other hand, an ethernet frame to be processed in the CPU 503 is input or output also via the PCI bus 502. Data stored in the ethernet frame that is input or output via the PCI bus 502 includes SNMP data for remote monitoring of equipment. The data is transmitted by using UDP/IP or TCP/IP. Equipment-setting data and various information data transmitted or received by using TCP/IP at application level are included as well. Further, there is an ethernet frame for ARP processing. As these data unlike video data need not to be transmitted in real time, they may be assigned a lower priority for processing over video data. However, unless these data are transmitted or received within a specified time period, the time-out can cause system failure. Hereinafter, the packet generated from these data is referred to as "non-priority packet".

At the time of transmission, the packet superimposing and separating part 201 controls transmission of the priority packet and the non-priority packet to output the ethernet frame. The physical layer processing part 203 performs processing of the physical layer to transmit the ethernet frame to ethernet. At the time of receipt, the ethernet frame received by the physical layer processing part 203 is input to the packet superimposing and separating part 201 to be separated into the priority packet and the non-priority packet. The priority packet is output to the video signal processing part 202 and the non-priority packet is output to the PCI interface 204. In addition, the non-priority packet is transferred to the PCI I/F part 204 in the form of ethernet frame including non-priority packet without termination processing of the ethernet frame being performed.

The video data as priority packet is subjected to expansion processing in the video signal processing part 202 to be output. On the other hand, the non-priority packet is transferred through the PCI interface 204 to the memory 504 via the PCI bus 502 and software-processed in the CPU 503. Main portion in first to fifth embodiments of the present invention is comprised of the packet superimposing and separating part 201, the PCI I/F part 204, the memory 504 and the CPU 503. In a sixth embodiment, a part of the video signal processing part 202 in addition to the above-mentioned elements is included in the main portion.

In the embodiments of the present invention, a transmission apparatus and a transmission method by using ethernet are described. For an interface between the packet superimposing and separating part 201 and the physical layer processing part 203, it is assumed that a standard MII interface is used in 10 Mbps or 100 Mbps ethernet and a standard GMII interface (IEEE802.3) is used in gigabit ethernet.

Figure 1:
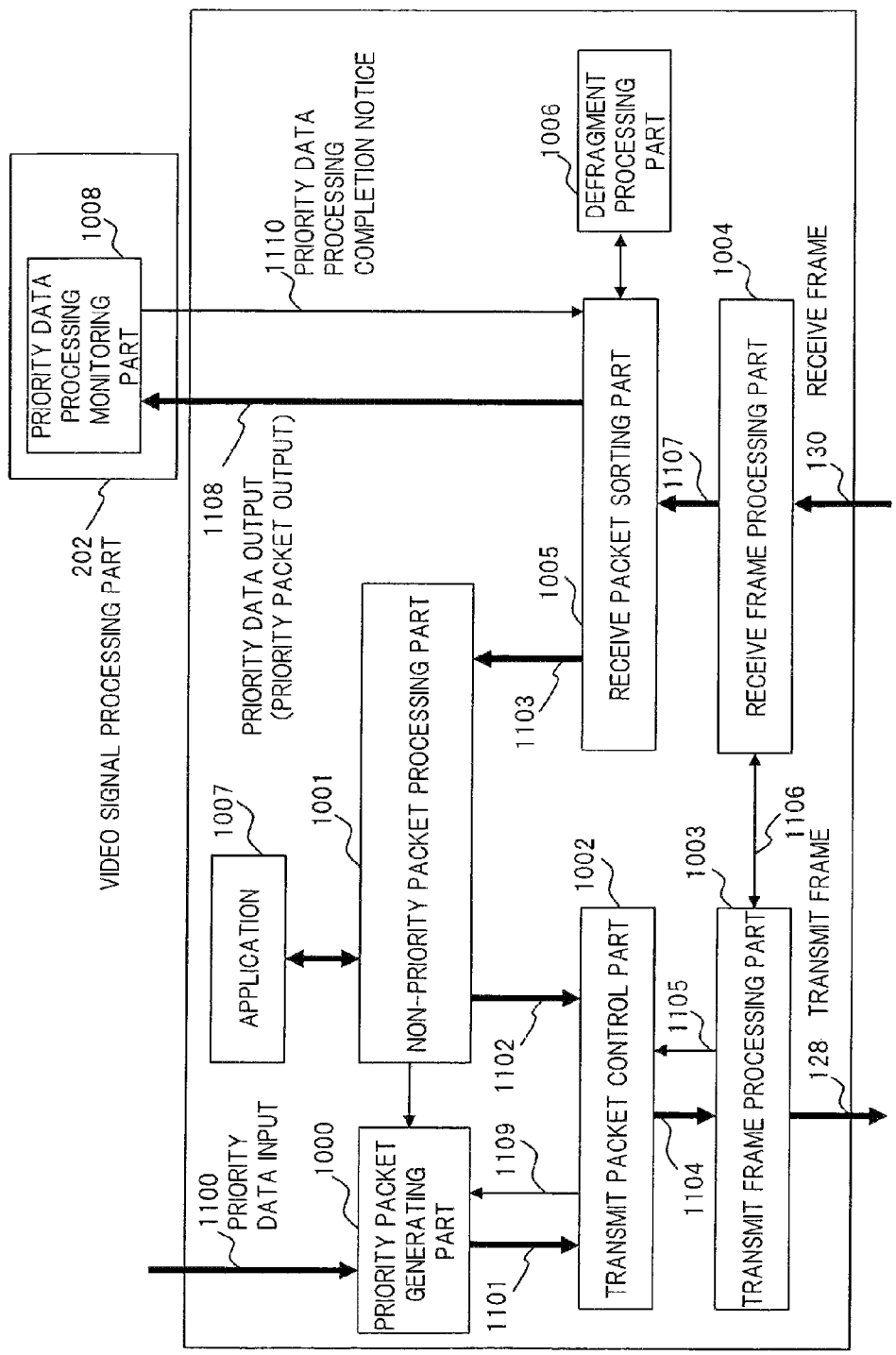
FIG. 1 is a block diagram showing the configuration of a transmission apparatus in accordance with an embodiment of the present invention.

FIG. 1 is a block diagram showing the configuration of a transmission apparatus in accordance with the embodiments of the present invention. Details of the transmission apparatus of the present invention described referring to FIG. 2 will be described with reference to FIG. 1 below.

FIG. 1 shows a priority packet generating part 1000, a non-priority packet generating part 1001, a transmit packet control part 1002 and a transmit frame processing part 1003. The non-priority packet generating part 1001 comprises the CPU 503, the memory 504 and the PCI I/F part 204 in FIG. 2. Reference numerals 1004, 1005, 1006 and 1007 denote a receive frame processing part, a receive packet sorting part, a defragmentation processing part and an application, respectively. A priority data processing monitoring part 1008 is mounted within the video signal processing part 202. The application 1007 is performed by the CPU 503. The priority packet generating part 1000, the transmit packet control part 1002, the transmit frame processing part 1003, the receive frame processing part 1004, the receive packet sorting part 1005 and the defragmentation processing part 1006 are contained in the packet superimposing and separating part 201 (not including the CPU) that performs hardware processing.

FIG. 1 illustrates all components of the transmission apparatus in accordance with the first to sixth embodiments. Each embodiment (first to sixth embodiments) realizes its function by using all or part of the components. In this description, each embodiment will be described with reference to the block diagram of FIG. 1.

Figure 3:
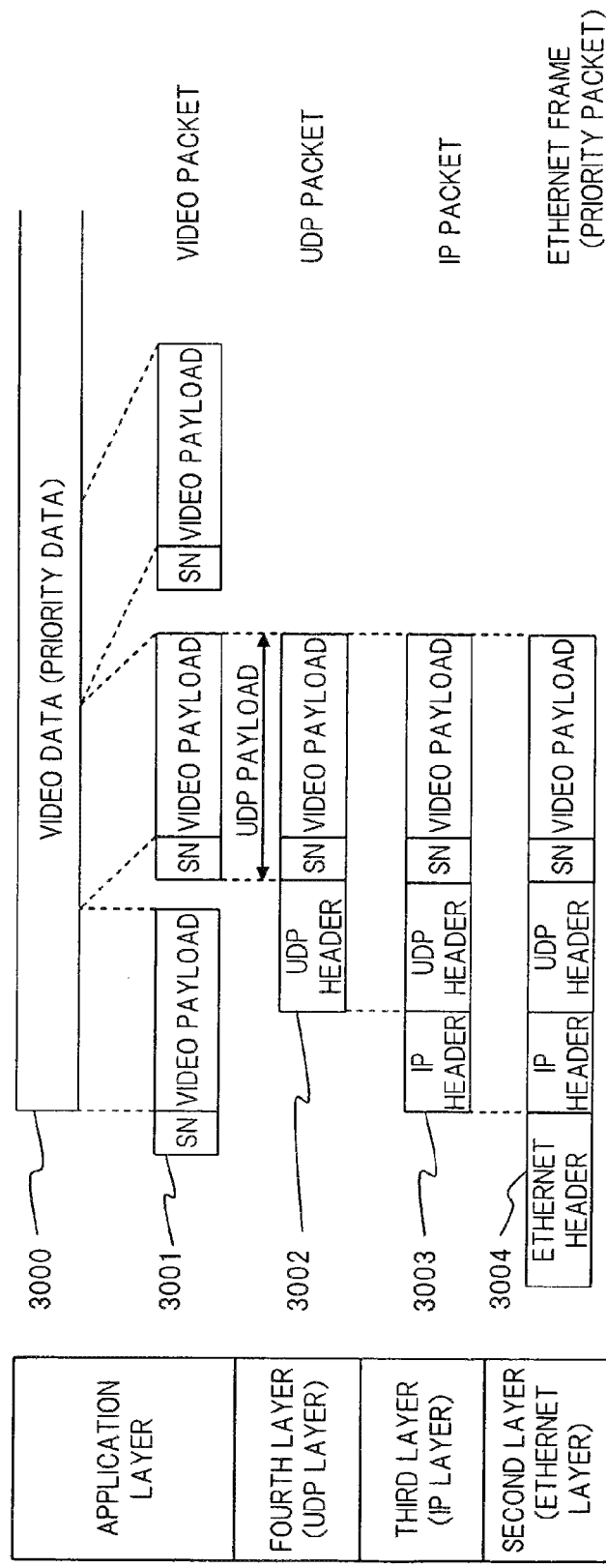
FIG. 3 is a diagram for describing the protocol stack of a priority packet in accordance with an embodiment of the present invention.

FIG. 3 shows the protocol stack of a priority packet in accordance with an embodiment. The transmission apparatus of the embodiment uses a UDP/IP protocol stack. A video data (priority data) 3000 as an application is separated into video payloads with a predetermined length and a sequence number (SN) is assigned to each video payload (3001). This sequence number identifies the position of the video data (a frame to which packet concerned belongs and its sequence within the frame) at receiving side. Any method of assigning the sequence number is available. The method of assigning the sequence number in the embodiment will be described.

The sequence number stratifies information of video frame number and information of position within video frame hierarchically, and they are represented by numerals 0 to 255 in 8 bits. The video frame number A and the position within video frame B are represented as (A, B).

The frame number 0 is assigned to an initial frame. The frame number is incremented by 1 for each succeeding frame. When the frame number reaches 255, then it returns to 0. It is assumed that packets 0 to 99 are generated within a frame. 0 to 99 are repeated for each frame. Therefore, the sequence number is assigned to video packets as follows.

(0,0)(0,1)(0,2) . . . (0,99)(1,0)(1,1)(1,2) . . . (1,99)(2,0)(2,1) . . .

In the case where the position-identifying information is included in the video data, the sequence number is not required.

When the video data is transmitted for error correction in matrix structure, A and B may be matrix number and position information within the matrix, respectively.

The data (video packet) to which the sequence number is assigned becomes a UDP payload of a lower layer.

To the video packet, a UDP header is added in a UDP processing layer (fourth layer) (3002). An IP header is further added in an IP layer (third layer) (3003). An ethernet header is further added in an ethernet layer (second layer) (3004).

The priority packet of the present invention means a packet in the ethernet layer. In the case of actual transmission through ethernet, the ethernet frame to which a preamble or error detection code is added is transmitted.

Figure 4:
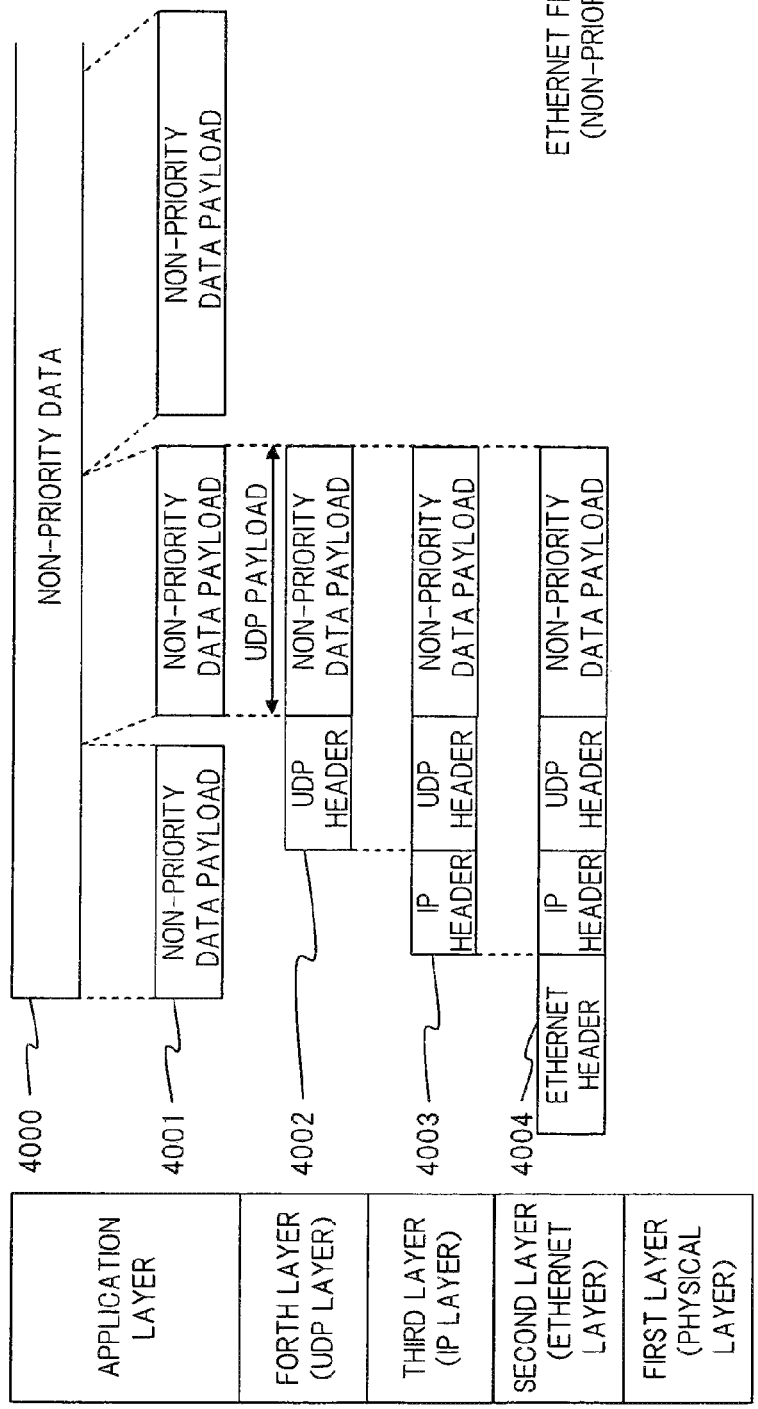
FIG. 4 is a diagram for describing the protocol stack of a non-priority packet in accordance with an embodiment of the present invention.

FIG. 4 shows a protocol stack of the non-priority packet. A non-priority data 4000 is separated into non-priority data payloads (4001). The non-priority data payload, to which a UDP header is added in the UDP layer (4002), an IP header is added in the IP layer (4003) and an ethernet header is added in the ethernet layer (4004), becomes a non-priority packet. Needless to say, the short non-priority data is not separated.

Details of the UDP header, IP header and ethernet header will be described later.

First Embodiment

A transmission apparatus and a transmission method in accordance with the first embodiment will be described. The transmission apparatus of the first embodiment shown in FIG. 1 has the priority packet generating part 1000, the non-priority packet generating part 1001, the transmit packet control part 1002 and the transmit frame processing part 1003. In the first embodiment, a transmission system is described.

In this embodiment, the video data shown in FIG. 3 is input as an input priority data 1100 (shown in also FIG. 2). For stream transmission of video data in real time, the video data need to be processed in preference to data requiring no real-time characteristic.

In the first embodiment, a transmit margin time is generated by controlling transmission of the priority packet. The "transmit margin time" means the period during which real-time characteristic of priority data stored in the priority packet cannot be impaired even if the non-priority packet is transmitted. The control method of the first embodiment transmits the non-priority packet as many as possible during the transmit margin time while giving a priority to transmission of the priority packet.

As shown in FIG. 3, the priority packet generating part 1000 generates the ethernet frame (priority packet 1101) by processing the video data 1100.

On the other hand, as shown in FIG. 4, the non-priority packet processing part 1001 generates a non-priority packet 1102 by software processing by means of CPU and transfer it. The non-priority packet is data requiring no real-time characteristic. The non-priority packet 1102 includes the packet used for the above-mentioned SNMP processing, ARP processing and so on. The ARP processing or other application among them has a response packet with respect to the transmission packet, and if there is no response within a specified time period, the time-out can cause system failure. For that reason, opportunity for transmitting the non-priority packet must be secured wherever possible. That is, the key point of the present invention is to enable transmission of the non-priority packet as many as possible while preventing real-time characteristic of the priority packet from being impaired.

With respect to the non-priority packets 1102 and 1103 in FIG. 1 (which are described in the third embodiment in detail and have no relations with the first embodiment), it is typically carried out to transfer the non-priority packet and a command relating to processing of the non-priority packet via a shared bus such as PCI bus.

Figure 5:
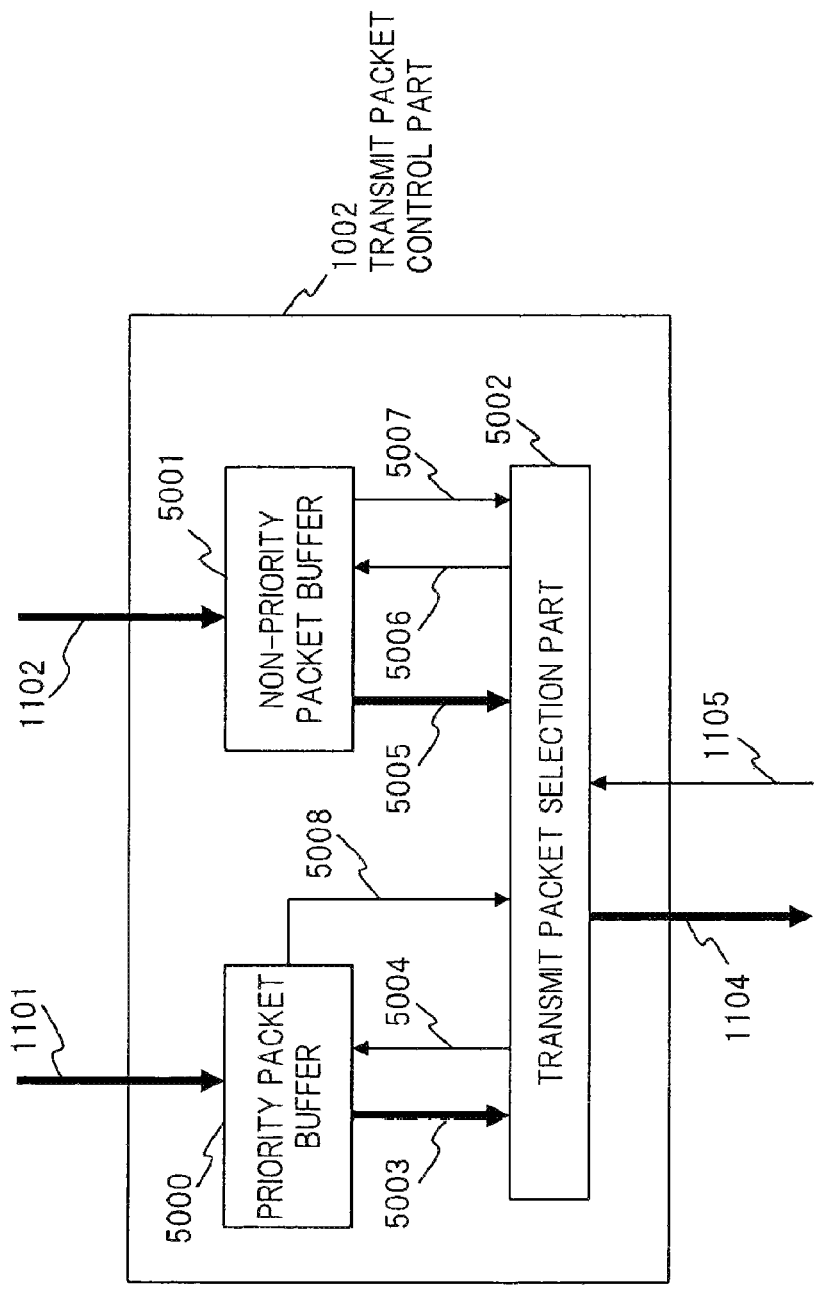
FIG. 5 is a block diagram showing the configuration of a transmit packet control part 1002 in accordance with an embodiment of the present invention.

FIG. 5 is a block diagram showing the configuration of the transmit packet control part 1002. In FIG. 5, reference numerals 5000, 5001 and 5002 denote a priority packet buffer, a non-priority packet buffer and a transmit packet selecting part, respectively.

Next, a transmit deciding method of the priority packet and the non-priority packet referring to FIG. 2 will be described. When the non-priority packet to be transmitted is generated, the non-priority packet buffer 5001 makes a request to transmit to the transmit packet selecting part 5002 by asserting a non-priority packet transmit request signal 5007. The transmit packet selecting part 5002 enables transmission from the non-priority packet buffer 5001 by asserting a non-priority packet transmit enabling signal 5006 that allows transmission of the non-priority packet without impairing real-time characteristic of the priority packet while giving a priority to transmission of the priority packet. The non-priority packet buffer 5001 transfers the non-priority packet 5005 to the transmit packet selecting part 5002. The transmit packet selecting part 5002 outputs the non-priority packet to ethernet through the transmit frame processing part 1003.

On the other hand, the priority packet buffer 5000 notifies the transmit packet selecting part 5002 of a priority packet information 5008. Specifically, the priority packet information 5008 is information representing whether the priority packet to be transmitted exists in the priority packet buffer 5000 or not and whether the priority packet 1102 is being written into the priority packet buffer 5000 or not.

When the priority packet to be transmitted is stored in the priority packet buffer 5000 (it can be seen from the priority packet information 5008), the transmit packet selecting part 5002 notifies the priority packet buffer 5000 of a priority packet transmit enabling signal 5004 that allows transmission of the priority packet. According to the notice, the priority packet 5003 is transferred from the priority packet buffer 5000 to the transmit packet selecting part 5002.

That is, the transmit packet selecting part 5002 realizes transmission of the non-priority packet so as not to cause system failure by acquiring the non-priority packet transmit request signal 5007 and the priority packet information 5008 and generating the transmit margin time while giving a priority to transmission of the priority packet. The method of generating the transmit margin time will be described specifically below.

Figure 6:
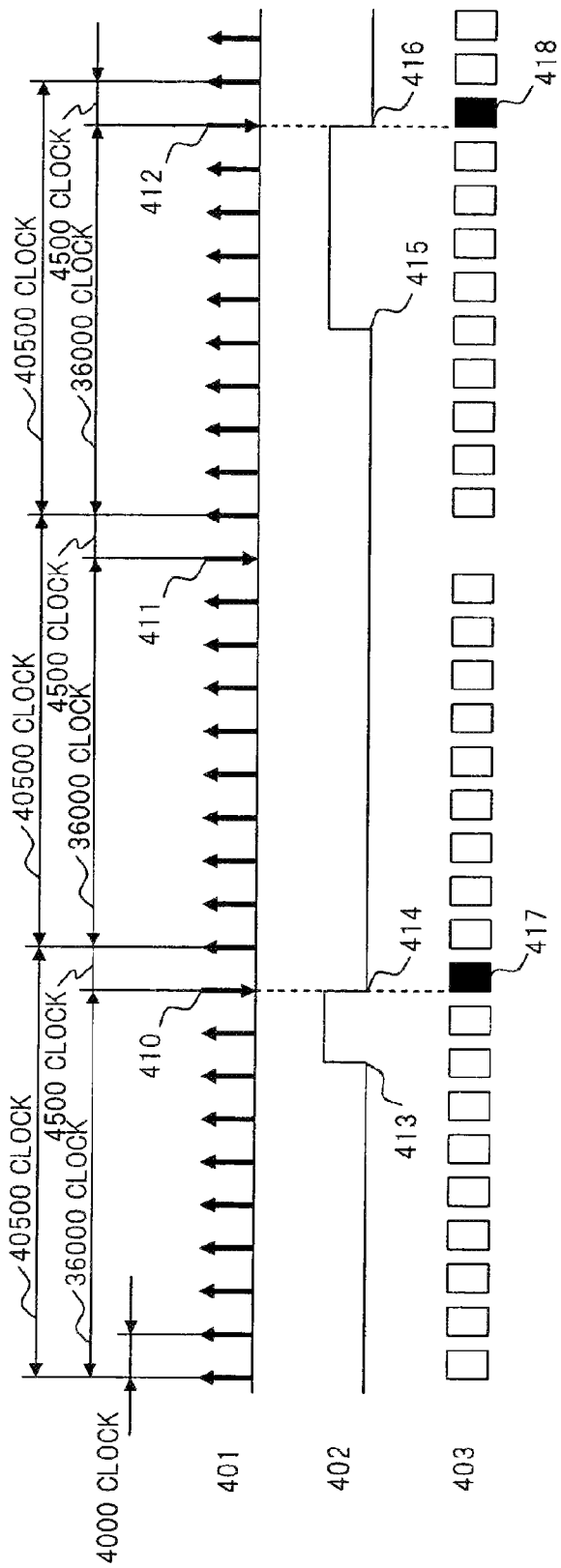
FIG. 6 is a transmission timing chart in a transmission method in accordance with an embodiment of the present invention.

FIG. 6 is a transmission timing chart in the transmission method in accordance with the first embodiment. The transmission method of the first embodiment is an example of transmit control methods of the priority packet and the non-priority packet.

In FIG. 6, reference numerals 401, 402 and 403 denote a transmit start timing of a transmission packet 1104, the non-priority packet transmit enabling signal 5007 and the transmission packet 1104, respectively. Of the transmit start timing 401, the priority packet transmit start timing is represented by up-arrow and the non-priority packet transmittable timing is represented by down-arrow. Of the transmission packet 403, the priority packet is illustrated by a white square and the non-priority packet is illustrated by a black square.

In this embodiment, the case where the following priority data is transmitted is described as an example. Assuming that the priority data is a video signal that data occurs at a constant bit rate (CBR) of 48 megabits/second (48 Mbps), the video payload length (shown in FIG. 3) is 1000 bytes and the system clock is 27 MHz.

Data rate of the priority data is 48 Mbps and it corresponds 6 megabyte/second (6 Mbps) on a byte basis. Therefore, the number of packets transmitted a second is $$6000000/1000=6000.$$

Accordingly, in the case where only the priority packets are transmitted, a packet should be transmitted once every 27000000/6000=4500 clocks. That is, 4500 clocks is an average transmission interval.

In the first embodiment, by transmitting the priority packet at shorter intervals than the average transmission interval, margin of timing for transmitting the non-priority packet (transmit margin time) is generated.

Specifically, transmission interval of the priority packet is set at 4000 clocks. This generates the transmit margin time during which transmission of the non-priority packet is permissible once every nine times of transmission of the priority packet. To transmit 9 priority packets at the average transmission interval of 4500 clocks, the time period of 40500 clocks is required as obtained by the following equation:

$$4500\times 9=40500$$

In this embodiment, as each priority packet is transmitted every 4000 clocks shorter than 4500 clocks, 9 priority packets can be actually transmitted during 36000 clocks (following equation).

$$4000\times 9=36000$$

Therefore, the transmit margin time of 4500 clocks (following equation) during which the non-priority is transmitted can be provided every 40500 clocks.

$$40500-36000=4500$$

In 401 of FIG. 4, the interval between an up-arrow at which the priority packet is transmitted and the next arrow is 4000 clocks. One non-priority packet transmission timing appears every nine priority packet transmission timings (410, 411 and 412). The interval between a down-arrow as non-priority packet transmission timing and the next arrow is 4500 clocks.

Reference numeral 402 represents the non-priority packet transmit request signal 5007. The non-priority packet to be transmitted is stored in the non-priority packet buffer 5001, the non-priority packet transmit request signal 5007 is asserted by the non-priority packet buffer 5001 (In FIG. 6, 402 becomes high).

The non-priority packet transmit request signal 5007 (402) becomes high at the timing 413 and then the non-priority packet transmit enabling signal 5006 is asserted at the timing 401 that enables transmission of the non-priority packet (not shown in FIG. 4) so that the non-priority packet 5005 (417) is transmitted. In the case where there is no more non-priority packet to be transmitted in the non-priority packet buffer 5001, the non-priority packet transmit request signal 5007 (402) is deasserted at the timing when transmission of the non-priority packet is started (timing 414).

At the timing 411, no non-priority packet to be transmitted exists in the non-priority packet buffer 5001 and the non-priority packet transmit request signal 5007 (402) is not asserted. As shown in 403, no non-priority packet is transmitted.

Next, the non-priority packet transmit request signal 5007 (402) is reasserted at a timing 415 and the non-priority packet 418 is transmitted at the timing 412. When transmission of the non-priority packet 418 is started, the non-priority packet transmit request signal 5007 (402) is deasserted.

In the case where plural non-priority packets are stored in the non-priority packet buffer 5001 at transmitting side, the non-priority packet transmit request signal 5007 (402) is not deasserted even if one non-priority packet is transmitted. Remaining non-priority packets are transmitted one by one at each succeeding non-priority packet transmit timing (down-arrow in 401). In this way, transmission of the non-priority packet is ensured while a priority is given to transmission of the priority packet.

The priority packet and the non-priority packet permitted to be transmitted are output from the transmit packet selecting part 5002 as the transmission packet 1104.

The non-priority packet has been transmitted in the non-priority buffer 5001 (that is, the entire non-priority packet is completely stored in the non-priority buffer 5001) and then the non-priority packet transmit request signal 5007 is asserted. This enables starting transmission of the non-priority packet immediately after the non-priority packet transmit enabling signal 5006 is asserted. As there causes no latency between transmission permission of the non-priority packet and actual transmission of the non-priority packet, the transmission method of this embodiment has a good transmission efficiency.

In the above-mentioned method, the timing at which the non-priority packet can be transferred is allocated at every specified time interval in advance. This is only an example, and in this embodiment unlike the third conventional example, time interval and timing allocated for the non-priority packet can be freely determined according to the application, thereby enabling flexible control on a clock basis.

In this embodiment, time period allocated for transmission of the priority packet and the non-priority packet is predetermined on a clock basis. However, in addition to this method, the following method may be adopted. For example, when a certain number of priority packets are stored in the priority packet buffer 5000, the priority packets are transmitted by priority at shorter intervals than the priority packet is generated in the priority packet generating part 1000 and the number of the priority packet stored in the priority packet buffer 5000 reaches a predetermined number or less, transmission of the non-priority packet may be allowed.

Next, another example of the transmit control method of the priority packet and the non-priority packet will be described.

When the priority packet information 5008 notifies that there is no priority packet to be transmitted in the priority packet buffer and the non-priority packet transmit request signal 5007 is asserted, the transmit packet selecting part 5002 asserts the non-priority packet transmit enabling signal 5006 to transmit the non-priority packet.

In order to further increase priority of the priority packet, when the priority packet information 5008 notifies that there is no priority packet to be transmitted, the priority packet 1101 is not being written into the priority packet buffer 5000 and the non-priority packet transmit request signal 5007 is asserted, the non-priority packet transmit enabling signal 5006 is asserted to transmit the non-priority packet. In the case where the priority packet 1001 is being written into the priority packet buffer 5000 even if there is no priority packet ready for transmission in the priority packet buffer 5000, it is considered that the priority packet is in preparation for transmission, and therefore transmission of the non-priority packet is kept waiting so that priority of transmission of the priority packet can be further increased. This feature is the present invention's unique effect to solve the problem of the prior art.

In this case, it is also possible that length of the non-priority packet ready for transmission in the non-priority packet buffer, that is, the time required for transmission of the non-priority packet is compared with the time period during which the priority packet that is being written into the priority packet buffer 5000 becomes prepared for transmission, and in the case where writing of the priority packet has not finished yet, even if transmission of the non-priority packet has finished, transmission of the non-priority packet is allowed.

According to this method, the non-priority packet can be transmitted whenever no priority packet to be transmitted exists or the priority packet is not in preparation for transmission, thereby to result in excellent transmission efficiency.

Next, an example in which transmission of the non-priority packet is ensured to some extent while giving a priority to transmission of the priority packet will be described.

In the case where a timer is provided in the transmit packet selecting part 5002 and after a predetermined time from the time point at which the non-priority packet transmit request signal 5007 is asserted, the above-mentioned condition under which transmission of the non-priority packet is allowed is satisfied, the priority packet transmit enabling signal 5004 is stopped and the non-priority transmit enabling signal 5006 allows transmission of one non-priority packet, for example. The above-mentioned predetermined time may be flexibly changed according to the application using the non-priority packet. In addition, the timer can be easily realized by using a counter.

This method has an effect of assuring quality of the application using the non-priority packet such as control signal while assuring real-time characteristic of the priority packet as well in the case where the application using the non-priority packet gives no response for a specified time period and causes time-out while giving a priority to transmission of the priority packet.

This feature to solve the problem of the prior art is the present invention's unique effect of assuring transmission quality of the non-priority packet while giving a priority to transmission of the priority packet.

As described above, the transmission apparatus and the transmission method in accordance with the first embodiment can control transmission of the priority packet and non-priority packet on a clock basis and ensure real-time communication, high quality transmission and transmission of the non-priority packet, resulting in stable systems operation. Furthermore, as control is performed on a clock basis, accurate shaping is achieved.

As described above, in the first embodiment, as the proportion of real time data and non-real time data can be flexibly changed at the time of transmission and the real time data can be transmitted on a clock basis by priority, there causes the effect of reducing delay in transmission of data.

In this embodiment, second is defined as a basic reference unit for transmission, transmission is controlled on a clock basis by generating a transmit reference signal (401) by more minute unit. However, the basic reference unit is not limited to second, and the transmit reference signal may be any signal so long as it is a reference signal of video data such as video frame and video field (hereinafter referred to as video period).

The essence of the present invention is to transmit the video data by priority for securing real-time characteristic and to assure a specified transmission quality of non-video data by separating the video period into more minute unit and controlling transmission. Therefore, whatever video signal period is used as the reference, it does not exceed the scope of the present invention.

In this embodiment, packet to be transmitted in real time, including video data is used as an example of the priority packet. It is apparent that the present invention is also useful in transmitting a large volume of specific data by priority, not in the case of real-time transmission. The present invention does not eliminate such transmission from its technical scope.

In this embodiment, an example is shown in which the priority packet is generated by hardware processing, the non-priority packet is generated independently (as a separate block from the priority packet) and then the priority packet is transmitted by priority on a clock basis by hardware. However, the present invention is not limited to this.

A transmission method using a processor and software in accordance with another embodiment of the present invention will be described below. As network processing is performed layer by layer in the conventional example, a heavy load is placed on the processor (CPU). In the conventional example, the transmission packet is processed layer by layer and a header is added thereto. In another embodiment of the present invention, in place of the processing by layer, an ethernet header, an IP packet header and a UDP packet header are prepared in advance and added by software simultaneously (all of the above-mentioned headers are simultaneously added to each video packet 3001 in FIG. 3). This reduces load on processor processing. The non-priority packet is subject to the similar processing by layer as implemented in the general operating systems.

According to this method, processing of the priority packet and software processing of the non-priority processing are separated logically by implementation in separate threads, and priority level of processing of the priority packet is made higher than that of non-priority packet.

For transmission control, a software timer in place of a hardware timer may be used.

This method can be realized by carrying out the processing by the transmit packet control part 1002 in FIG. 1 in the processor.

Although this method is inferior to the method by means of hardware in accuracy of transmission control, it has an effect of the present invention, which can vastly reduce load on processor processing compared with the prior art. Therefore, the present invention does not eliminate such configuration from its scope.

Second Embodiment

A transmission apparatus and a transmission method in accordance with a second embodiment will be described. In the second embodiment, the transmit system and the receive system is described.

In carrying out IP transmission, ARP as a protocol for obtaining a physical address (MAC address) of ethernet from a destination IP address is used.

Figure 8:
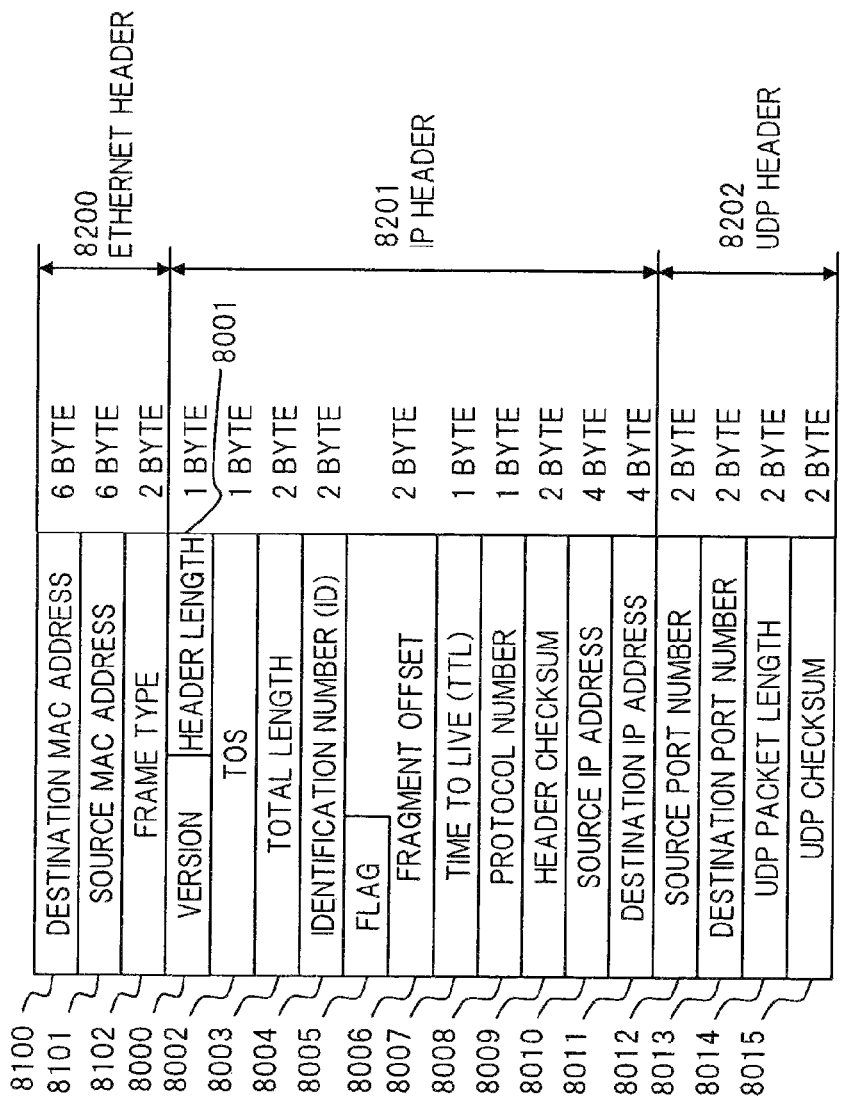
FIG. 8 is a diagram for showing details of UDP, IP and ethernet protocol headers in accordance with an embodiment of the present invention.

FIG. 8 is a diagram for showing details of UDP, IP and ethernet protocol headers in accordance with the embodiment of the present invention. In carrying out IP transmission, the transmission apparatus of the embodiment resolves a destination MAC address 8100 from a destination IP address 8011 in FIG. 8 and stores it in the ethernet header 3004 in FIG. 3 to constitute a packet.

This ARP is performed through two-way communication. Typically, address is resolved by using a processor and a correspondence table of the destination IP address and the destination MAC address is held in the memory. As ARP is not a processing requiring real-time characteristic, the packet used for ARP is processed as a non-priority packet. The processing in the transmission apparatus in accordance with the second embodiment of the present invention will be described with reference to FIG. 1.

In FIG. 1, the transmission apparatus of the second embodiment has the priority packet generating part 1000, the non-priority packet generating part 1001, the transmit packet control part 1002, the transmit frame processing part 1003, the receive frame processing part 1004 and the receive packet sorting part 1005. In FIG. 1, the application 1007 for software processing of ARP is also shown.

To resolve the MAC address to be transmitted from the destination IP address of the priority packet, the application 1007 generates a packet for ARP (hereinafter referred to as "ARP request packet") in the non-priority packet processing part 1001. The ARP request packet is converted into an ethernet frame via the transmit packet control part 1002 and the transmit frame processing part 1003. A transmit frame 128 as the ethernet frame is transmitted.

On the other hand, a response packet including the resolved MAC address to be transmitted in response to the ARP request packet (hereinafter referred to as "ARP response packet") is received as a receive frame 130 in the receive frame processing part 1004. The ARP response packet is determined to be the non-priority packet in the receive packet sorting part 1005 and transferred to the non-priority packet generating part 1001. The non-priority packet processing part 1001 holds the correspondence table of the destination IP address and the destination MAC address and notifies the MAC address to the priority packet generating part 1000.

The priority packet generating part 1000 stores the resolved MAC address in 8100 in FIG. 8 (ethernet header in FIG. 3) and generates the priority packet to output.

Generally, ARP protocol processing is implemented in the operating system. Therefore, the IP address and the MAC address can be easily associated with each other by utilizing the standard software and processor.

Even when the destination IP address is changed, header information that the priority packet requires can be obtained flexibly by software and the priority packet itself is generated at high speed by hardware so that real-time characteristic of data transmission can be ensured.

In addition, it goes without saying that the present invention is useful in all cases where any parameter necessary for communication with target, such as negotiation of UDP port number to be used, is determined mutually by combination of software and processor (CPU) and the value is reflected in the priority packet.

Third Embodiment

A transmission apparatus and a transmission method in accordance with the third embodiment will be described. A receive system is described in the third embodiment.

In FIG. 1, the transmission apparatus of the third embodiment has the receive frame processing part 1004, the receive packet sorting part 1005 and the non-priority packet processing part 1001.

The receive frame processing part 1004 receives the receive frame 130 in which the priority packet and the non-priority packet exist together from the physical layer processing part 203 in FIG. 2, processes only valid ethernet frame to be received therein and outputs a receive frame 1107.

The receive packet sorting part 1005 receives input of the receive frame 1107 and sorts it into a priority packet 1108 and a non-priority packet 1103. The method of sorting packets in the receive packet sorting part 1005 will be described below.

In this embodiment, UDP/IP is used in transmission of the priority packet. Location of the IP header and the UDP header is decided from the head of the ethernet header of the second layer shown in FIG. 3. Therefore, information of these headers is inspected to sort the priority packet and the non-priority packet.

That is, the receive packet sorting part 1005 receives packet in the ethernet layer as the second layer (protocol layer 1) and the UDP layer as the fourth layer (protocol layer 2) is also inspected for sorting of the priority packet and the non-priority packet.

FIG. 8 shows an ethernet header 8200 and an IP header 8201.

When a frame type 8102 of the ethernet header 8200 is 0X8000 that represents IP protocol (0X represents hexadecimal), the packet is determined as a priority packet. In the IP header 8201, a protocol number 8008 must represent 17 that represents UDP as a protocol used in the priority packet and transmit source address must represent an IP address of the predetermined transmit source. Further, a transmit source port number 8012 and a destination port number 8013 of the UDP header 8202 must be predetermined number. It goes without saying that the packet that uses protocol other than UDP is processed as the non-priority packet. The above-mentioned value negotiated between receive and transmission terminals in advance may be determined in the application 1007 prior to transmission by negotiating mutually (the transmission apparatus of the embodiment and an apparatus of other party) in the non-priority packet processing part 1001 and set in the receive packet sorting part 1005.

The packet determined to be the priority packet is output as a priority packet output 1108. At this time, as the UDP (fourth layer), IP (third layer) and ethernet (second layer) processing is terminated in the receive packet sorting part 1005 and only priority data is transferred with headers being removed, no burden of processing is imposed on the upper application such as video.

The above-mentioned inspection is just an example and inspection may be added or omitted if required.

All of the packets other than the packet determined to be priority packet in the above-mentioned inspection are transferred to the non-priority packet processing part 1001. At this time, the UDP (fourth layer), IP (third layer) and ethernet (second layer) processing is not terminated in the receive packet sorting part 1005 and the received packet (ethernet frame of the second layer) is transferred as it is to the non-priority packet processing part 1001. In the non-priority packet processing 1001, fragment reconfiguration of the non-priority packet and processing of UDP/IP, TCP/IP and the upper application 1007 are performed by software processing using a processor.

As mentioned above, in the third embodiment, the receive packet sorting part 1005 inspects headers of the IP (third layer) and UDP (fourth layer) in the ethernet frame layer (second layer). In this way, the receive packet sorting part 1005 sorts the priority packet and the non-priority packet. The sorted priority packet and non-priority packet are processed independently (in separate blocks). As the priority packet is processed by the dedicated hardware, no abandonment of packet occurs so that high-quality video and real-time characteristic can be ensured. At this time, in the case where a dedicated bus in place of s common bus is used for transmission of the priority packet as shown in 1108 of FIGS. 1 and 2, the transmission does not come under the influence of transmission of the non-priority packet, thereby to enhance the effect of the present invention. However, even if the dedicated bus is not used (only the common bus is used), the effect of the present invention can be obtained. Therefore, the configuration in which only the common bus is used is not eliminated from the scope of the present invention.

In this embodiment, IPv4 (Internet Protocol version 4) is used as an example. In the case of using IPv6 (Internet Protocol version 6), as a flow label is assigned to the packet used for communication at each connection, it is possible to inspect the flow label and sort the priority packet and the non-priority packet in the receive packet sorting part 1005.

Although the packet to be transmitted in real time such as video is taken as an example of priority packet, it is apparent that the present invention is effective in the case where a large volume of specific data is transmitted and received by priority, not in the case of real-time transmission. Such case is not eliminated from the scope of the present invention.

The filtering condition for sorting the priority packet and the non-priority packet may be determined in advance. Alternatively, prior to transmission, it may be determined depending on the application software that decided by negotiation with the transmission terminal.

Further, in this embodiment, the UDP/IP layer and the ethernet layer as a lower layer are used for the priority packet. The present invention is not limited to it and is available in the transmission apparatus and the transmission method that use other arbitrary protocol capable of discriminating the priority packet from the non-priority packet. Such transmission apparatus and transmission method are not eliminated from the scope of the present invention.

Further, in this embodiment, hardware achieves separation between the priority packet and the non-priority packet, and performs processing of the priority packet after separation independent from that of the non-priority packet (in separate blocks). This shows an example of realizing the best quality of communication that packet abandonment due to missing packet in the receive terminal never occurs even when fluctuation occurs in the network and the receive packet reaches to the receive terminal in burst fashion. The present invention is not limited to it. A transmission method in accordance with another embodiment in which a processor and software achieve separation between the priority packet and the non-priority packet, and performs processing of the priority packet after separation independent from that of the non-priority packet will be described below.

In prior art, as network processing is performed layer by layer, a big burden is imposed on the processor (CPU).

In the other embodiment, sorting (filtering) condition for the priority packet is preset by software and the IP packet header and the UDP packet header are analyzed simultaneously in software to determine the receive packet as priority packet. The receive packet is not analyzed by layer whether it is the priority packet or not. The packet determined as priority packet is subject to termination processing and transferred to the priority data dedicated processing part of succeeding processing. The non-priority packet is processed by layer as implemented in the general operating systems.

According to this method, processing of the priority packet and software processing of the non-priority processing are separated logically by implementation in separate threads, and priority level of processing of the priority packet is made higher than that of non-priority packet.

Further, this method can be achieved by performing processing of the receive packet sorting part 1005 in FIG. 1 by the processor.

This method is inferior to the method in which processing of the receive packet sorting part 1005 is performed by hardware in priority level of processing of priority data. However, it goes without saying that this method has an effect of the present invention that cannot be obtained in prior art. Therefore, such configuration is not eliminated from the scope of the present invention.

Fourth Embodiment

A transmission apparatus and a transmission method in accordance with the fourth embodiment will be described. In the fourth embodiment, a receive system is described. The present invention relates to fragment as processing of splitting the IP packet and defragment as processing of reconfiguring the IP packet. Firstly, summary of fragment and defragment will be described.

Figure 7:
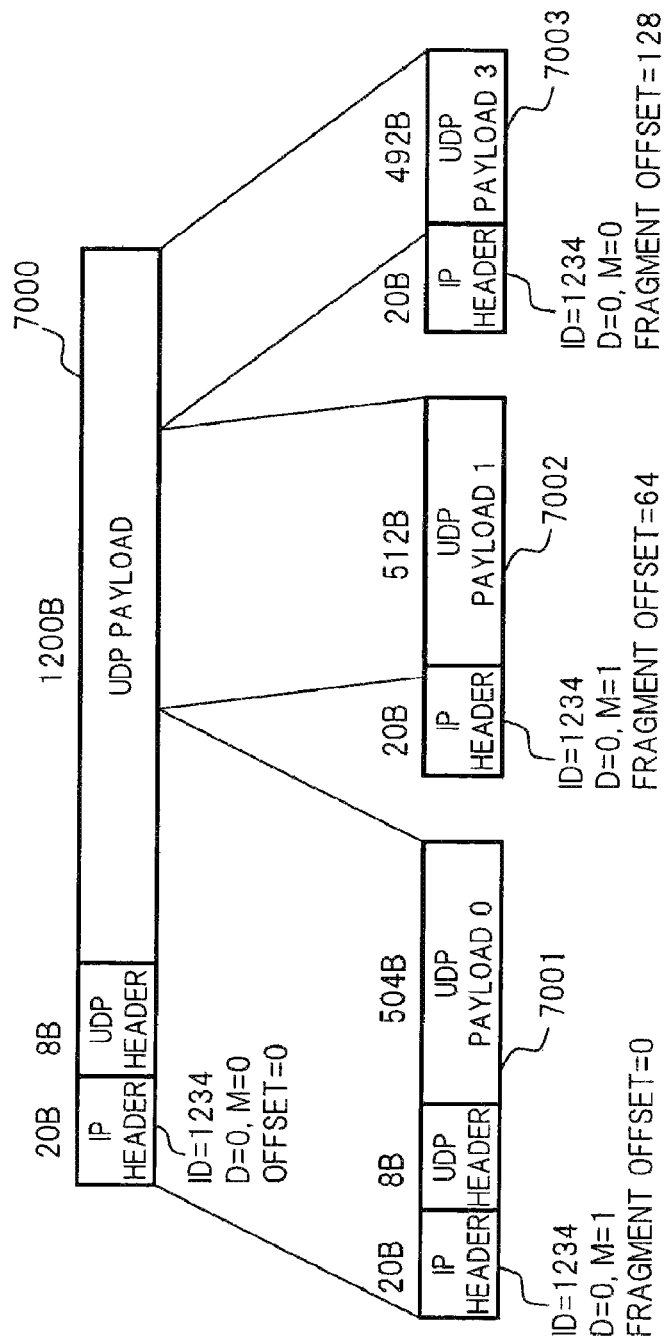
FIG. 7 is a schematic diagram of fragment in an embodiment of the present invention.

FIG. 7 is a schematic diagram of fragment. Firstly, summary of fragment will be described referring to FIG. 7. In FIG. 7, numeral reference 7000 denotes a packet before being fragmented and numeral references 7001, 7002 and 7003 denote a fragmented packet. At the receive terminal, the fragmented packets are reconfigured based on information stored in the IP header of each received packet (defragment).

In the IP header 8201 of FIG. 8, reference numerals 8000, 8001, 8002, 8003, 8004, 8005, 8006, 8007, 8008, 8009, 8010 and 8011 denote version information of 4 bits, header length of 4 bits, Type of Service (TOS), total length of IP packet, identification number, fragment flag of 3 bits, fragment offset of 13 bits, Time to Live (TTL), protocol number, header checksum, source IP address and destination IP address, respectively. As details of the IP header shown in FIG. 8 are explained in detail in written standards or various books, only the part relating to the fourth embodiment will be described.

Information required to reconfigure fragment packets is the identification number 8004, the flag 8005 and the fragment offset 8006.

The flag 8005 consists of 1 bit representing permission/nonpermission of fragment (represented by D in FIG. 7. 0 indicates permission of fragment and 1 indicates nonpermission of fragment), 1 bit representing which it is a final fragmented packet or a non-final fragmented packet (represented by D in FIG. 7. 0 indicates a final fragment packet and 1 indicates non-final fragment packet) and another 1 bit. Fragment is performed in units of 4 bytes and the offset is represented in units of 4 bytes in the fragment offset 8006.

In the example shown in FIG. 7, 1208 bytes in total consisting of the IP header and the UDP payload are fragmented into 512 bytes of the UDP header and the UDP payload of 7001, 512 bytes of the UDP payload 1 of 7002 and 492 bytes of the UDP payload 3 of 7003.

As 7001, 7002 and 7003 are IP packets fragmented from 7000, their identification numbers 8004 are identical to that of 7000 (1234 in FIG. 7). As fragment of 7000 is permitted, the bit D representing fragment permission indicates 0. The bit M representing which it is final fragmented packet or not indicates 0 only in 7003 and 1 in 7001 and 7002. The fragment offset is stored in the IP header corresponding to each IP packet.

As described above, as the fragmented packets 7001, 7002 and 7003 have all information necessary for defragment in the respective IP header, defragment can be carried out in the receive terminal.

Ordinality of IP packets is not ensured in the network and fragmented packets are not necessarily received in orderly sequence. Specifically, it is not ensured that 7001, 7002 and 7003 in FIG. 7 are received in this order. For example, there is a possibility that 7003, 7001 and 7002 are received in this order.

Generally, defragment processing is performed by storing all of the received IP packets in the main memory of computer once and reconfiguring them by means of software for defragment mounted in the multi-purpose operating system. According to the above-mentioned method, however, as the priority packet and the non-priority packet are stored together and defragment processing of the non-priority packet can obstruct processing of the priority packet, real-time characteristic obtained by giving a priority to processing of the priority packet cannot be ensured.

The transmission apparatus of the fourth embodiment has the defragment processing part 1006 as a dedicated processing part of defragment processing of the priority packet. This prevents processing of the priority packet from being obstructed due to defragment processing of the non-priority packet.

In FIG. 1, the transmission apparatus of the fourth embodiment has the receive frame processing part 1004, the receive packet sorting part 1005, the defragment processing part 1006 and the non-priority packet processing part 1001.

The receive frame processing part 1004 receives the receive frame 130 in which the priority packet and the non-priority packet exist together from the physical layer processing part 203 in FIG. 2, processes only valid ethernet frame to be received therein and outputs the processed frame as the receive frame 1107 to the receive packet sorting part 1005.

In the case where the receive IP packet (receive frame 1107) is not fragmented, the receive packet sorting part 1005 determines whether the receive packet is the priority packet or the non-priority packet according to the method described in the third embodiment and outputs it as the priority packet 1108 or the non-priority packet 1103.

In the case where the receive IP packet is fragmented, protocol used according to the protocol number 8008 is determined. If the protocol used is non-UDP, the packet is determined as the non-priority packet and transferred to the non-priority packet processing part 1001.

In the case where the protocol used is UDP, the receive packet is determined whether it is the first packet of the fragmented packets. If the receive fragmented packet is the first packet, the fragment offset is 0. Moreover, if the receive fragmented packet is the first packet, the UDP header is always added to the head of the payload so that it can be determined whether the receive fragmented packet is the priority packet or the non-priority packet.

In the case where the receive fragmented packet is determined as a first packet of the priority packets, the packet is transferred to the defragment processing part 1006. On the other hand, in the case where the receive fragmented packet is determined as the non-priority packet, the packet is transferred to the non-priority packet processing part 1001. At this time, the receive packet sorting part 1005 stores unique ID of each receive packet and information representing whether the receive packet is the priority packet or the non-priority packet (hereinafter referred to as "determination ID") in the memory of the receive packet sorting part 1005 as information for determining whether remaining fragmented packet received later is the priority packet or the non-priority packet.

On the other hand, in the case where the receive fragmented packet is not a first packet, the ID 8004 of the receive fragment packet is searched. When there is information in the ID 8004, it can be determined whether the receive packet is the priority packet or the non-priority packet and it is decided whether it is transferred to the defragment processing part 1006 or non-priority packet processing part. When there is no information in the ID 8004, the receive packet is transferred to the defragment processing part 1006 and the first packet of the ID is awaited to arrive. In the case where the first packet of the ID arrives and determined to be the priority packet in the receive packet sorting part 1005, the first packet and receive packet received previously are defragmented in the defragment processing part 1006. In the case where the first packet of the ID is determined to be the non-priority packet, the receive packet is transferred to the non-priority packet processing part 1001. The receive packet sorting part 1005 notifies the defragment processing part 1006 of the determination information. The defragment processing part 1006 transfers all non-priority packet of the ID stored therein to the non-priority packet processing part 1001 through the receive packet sorting part 1005. At this time, it is stored in the receive packet sorting part 1005 that the ID is the non-priority packet. Therefore, when remaining fragmented packets of the ID are received later, the receive packets are transferred directly to the non-priority packet processing part 1001. Alternatively, the defragment processing part 1006 may transfer the non-priority packet directly to the non-priority packet processing part 1001.

The defragment processing part 1006 performs defragment processing of the priority packet. When defragment processing of each packet is finished, the defragmented packet is transferred as the priority packet 1108 through the receive packet sorting part. At this time, the ID is deleted from a list of IDs for determination of the priority packet, which is stored in the receive packet sorting part 1005.

Further, it is possible to directly output the defragmented packet as the priority packet, not through the receive packet sorting part 1005 and notify the receive packet sorting part 1005 of only the request to delete the ID from the list of IDs for determination of the priority packet.

The non-priority packet processing part 1001 performs defragment processing of the non-priority packet. This processing is performed by the multi-purpose processor and software for defragment processing that mounted in the multi-purpose operating system.

The determination ID held in the receive packet sorting part 1005 may be deleted automatically after a specified time by providing a timer. This enables reducing the amount of memory necessary for the table.

There is a case where whole or part of the fragmented packets are not received due to abandonment of the packet in the network, thereby failing to complete defragment. Each IP packet stored in the defragment processing part 1006 may be deleted after a lapse of a specified time from storage by providing a timer. The timer can be easily configured by using a counter.

Specific configuration of the defragment processing part is disclosed in IEFT RFC 815. As the configuration is also disclosed in the operating system source cord of which is published, the person skilled in the art can realize the defragment processing part with ease.

In this embodiment, the UDP packet is defined as the priority packet. The configuration in which the packet using other protocol is defined as the priority packet is not eliminated from the scope of the present invention. In the transmission apparatus in which only the packet using a particular protocol is defined as the priority packet and the packet using the other protocol is defined as the non-priority packet, it can be determined whether the receive packet is the priority packet or the non-priority packet according to the protocol number 8008 included all of the fragmented IP packets. In such apparatus, determination between the priority packet and the non-priority packet can be achieved easily.

In the transmission apparatus and the transmission method in which the UDP packet is defined as the priority packet and the packet of the other protocol is defined as the non-priority packet, it can be determined whether the receive packet is the priority packet or the non-priority packet according to the protocol number 8008 included all of the fragmented IP packets. In such apparatus, determination between the priority packet and the non-priority packet can be achieved easily.

Further, even in the case where UDP is used for both of the priority packet and the non-priority packet, if the non-priority packet is a short packet at all times, the packet is fragmented at a very low probability or is not fragmented. Therefore, the receive packet sorting part 1005 can perform an efficient determination.

In the case where defragment processing of the priority packet is undesired at receipt side, Maximum Transmission Unit (MTU) of the packet that is not fragmented in the communication network is previously inspected in the processing at the application level and the packet of the size not greater than MTU is transmitted. Alternatively, as the RFC standard provides that all terminals must be able to handle the IP packet of a size of 576 bytes, many network devices such as router do not fragment the IP packet of a size of 576 bytes or less. Therefore, the priority packet should be configured so that the size of the IP packet becomes 576 bytes or less. In the transmission system in which the priority packet is not fragmented as described above, all of the received packet, if fragmented, should be handled as the non-priority packet. Unless fragmented at the transmission terminal, the packet size of which exceeds allowable maximum value of the IP packet on ethernet cannot be transmitted. It goes without saying that all transmit packets must have a size not greater than the allowable maximum value of the IP packet so as not to fragment the priority packet.

Further, in the case where the probability of occurrence of fragment in the communication network is very low, fragment of the priority packet during transmission can be prevented by transmitting the priority packet with the flag of no-fragment being put on the IP packet of the priority packet at transmission side. In the situation where the router is obliged to fragment the receive packet, the IP packet is abandoned. This enables reducing burden for defragment processing at receive terminal. In this case, although a small number of the priority packets are lost, communication quality can be compensated by error correction or error modification at receive side.

As described above, in the transmission apparatus of the fourth embodiment, multiple defragment processing parts are provided separately for each of the priority packet and the non-priority packet. In the fourth embodiment, it is determined whether the fragmented packet is the priority packet or the non-priority packet to decide which of defragment processing parts is used. This can prevent processing of the priority packet from obstructing due to defragment processing of the non-priority packet. Real-time characteristic of the priority data can be ensured, thereby to enable high-quality transmission of video and audio.

Fifth Embodiment

A transmission apparatus and a transmission method in accordance with the fifth embodiment will be described. In the fifth embodiment, a transmit system and a receive system are described.

In FIG. 5, the transmission apparatus of the fifth embodiment has the priority packet generating part 1000, the transmit packet control part 1002, the transmit frame processing part 1003 and the transmit frame processing part 1004.

In the fifth embodiment, in the case of adding a parity for error correction to the priority data and transmitting the data as the priority packet, when transmission of the priority packet is suspended due to congestion of network, or when transmission of the priority packet ends in failure and therefore transmission schedule of the priority packet is delayed by transmitting the packet again, whole or part of the packets for error correction are not transmitted. As a result, transmission of the priority packet constituting of priority data is ensured.

Figure 9:
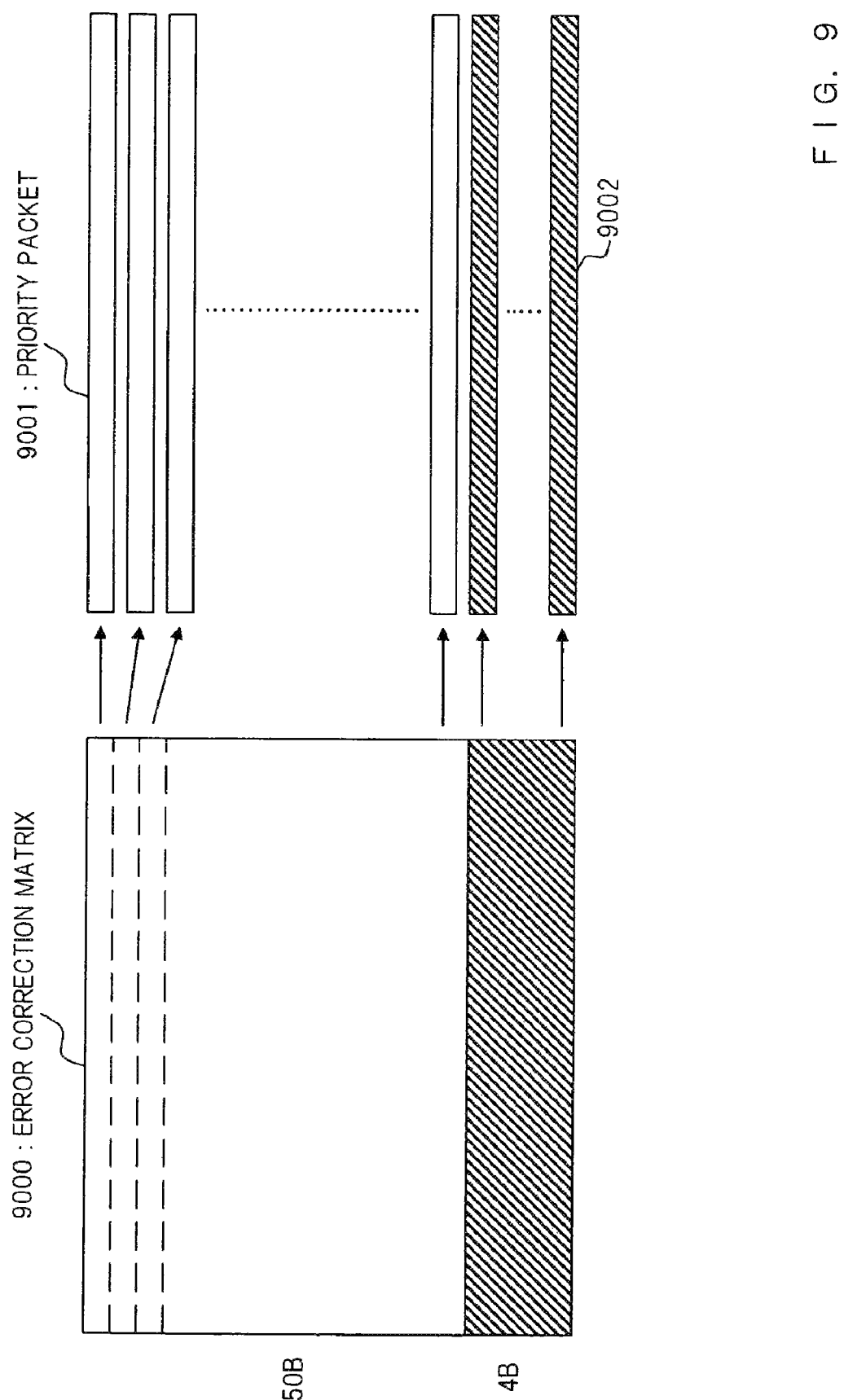
FIG. 9 is a schematic diagram of an error collection matrix and a priority packet in accordance with an embodiment of the present invention.

FIG. 9 is a schematic diagram of an error collection matrix and the priority packet formed therefrom. The error correction matrix 9000 stores data in the row direction and calculates the parity for error correction in the column direction to constitute the matrix. As shown by 9001, each row of the error correction matrix constitutes the payload of the priority packet. The transmission apparatus adds the UDP/IP and ethernet headers to each row. In FIG. 9, the portion that stores priority data is indicated by space and the portion that stores parity for error correction is indicated by hatching. Moreover, FIG. 9 shows an example that 4 bytes of parity is added to 50 bytes of data. However, technical scope of the present invention is not limited to this method. There are many known prior arts relating to such error correction method, which can be understood by persons skilled in the art. This error correction processing is carried out in the priority packet generating part 1000.

Figure 10:
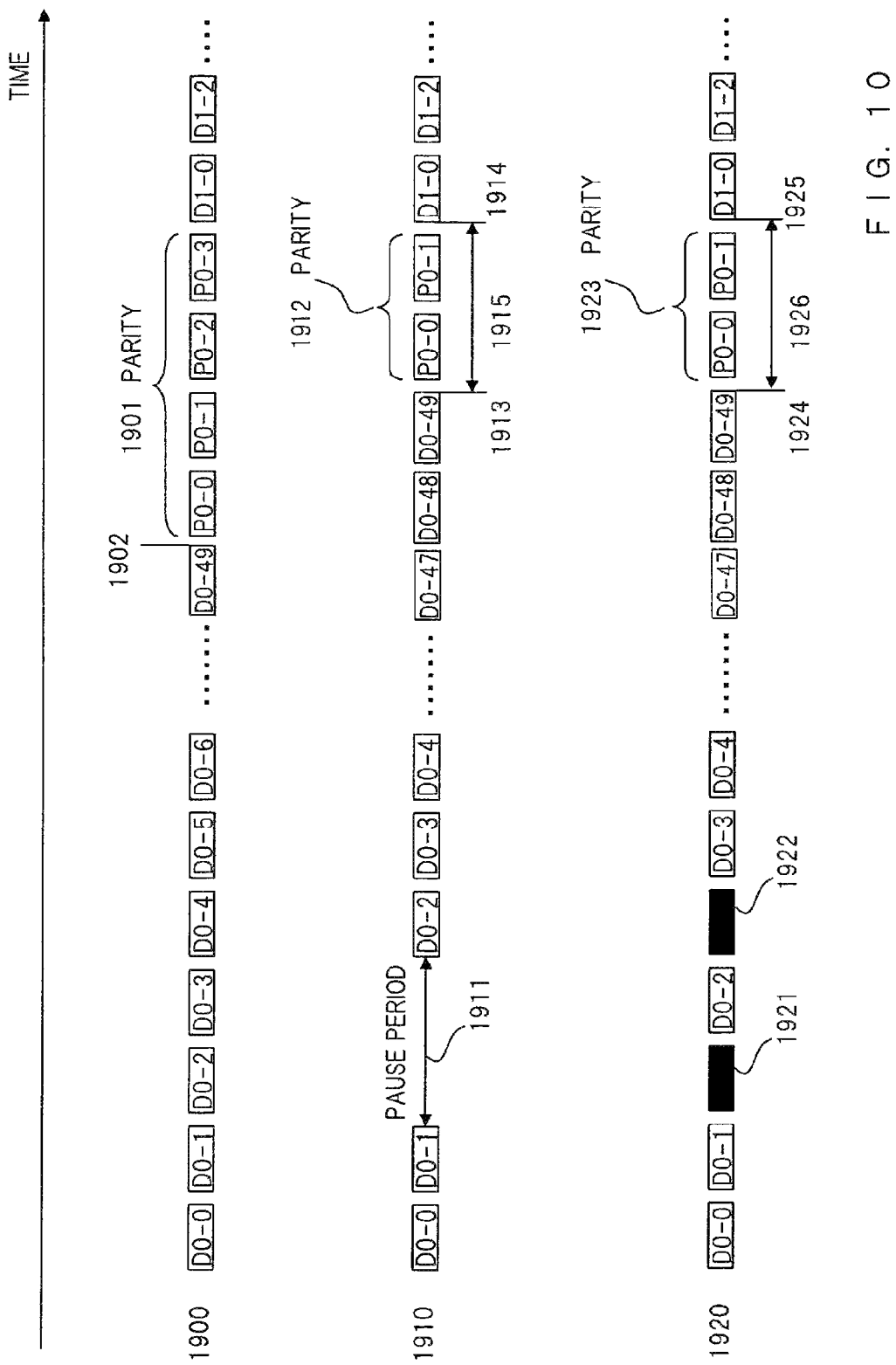
FIG. 10 is a conceptual diagram for describing a fifth embodiment of the present invention.

FIG. 10 is a conceptual diagram of the packet in accordance with the fifth embodiment. In FIG. 10, the packet consisting of priority data (hereinafter referred to as "priority data packet") and the packet consisting of parity for error correction (hereinafter referred to as "error correction packet") are represented as D and P, respectively. Matrix number is represented immediately after these characters and then number within the matrix of each of priority data packet and error correction packet is represented after hyphen (-). For example, the sixth priority data packet with matrix number of 0 is represented as D0-5 (note that the packet number starts from 0).

Numeral reference 1900 shows transmission in normal state. Firstly, 50 priority data packets (D0-0 D0-49) are transmitted. Next, 4 error correction packets (P0-0 P0-3) are transmitted (1901).

In full-duplex transmission of ethernet, when the transmission terminal transmits a lot of packets all at once and therefore the buffer of router connected to the transmission terminal can cause overflow, a signal to request suspension of transmission (hereinafter referred to as "pause signal") is sent from the router to the transmission terminal. Actually, this pause signal consists of an ethernet frame and information on the period requiring suspension is stored in the ethernet frame. This procedure is specified in IEEE802.3.

The pause signal is received in the receive frame processing part 1004 and transmit suspension time requested from the router is notified to the transmit frame processing part 1003 through a path 1106. The transmit frame processing part 1003 suspends transmission of the packet in its buffer and at the same time, notifies the transmit packet control part 1002 of transmit suspension through a path 1105 to suspend transfer of any new packets.

In half-duplex transmission, when collision between transmit packets from each terminal is detected, these packets are not transmitted normally and must be retransmitted. Collision is detected at the receive frame processing part 1004 and notified to the transmit frame processing part 1003, and after that, notified to the transmit packet control part 1002. Then, transmit suspension time is determined randomly. After that, the packets that are not transmitted successfully due to collision are retransmitted. This procedure is specified in IEEE802.3.

In 1910, 1911 denotes transmit suspension period according to the pause signal (hereinafter referred to as "pause period"). D0-2 and D0-3 to be transmitted during the pause period are transmitted after the pause period. Therefore, transmission of the priority data packets is completed at 1913 later than normal. After that, the error correction packets are transmitted. At this time, as the period (1915) until transmission of the packet of next matrix starts (1914) is short, less number of the error correction packets are transmitted (in 1910, P0-2 and P0-3 are not transmitted), thereby to prevent from having an effect on transmission schedule of the next matrix.

In 1920, 1921 and 1922 shows that packets are not transmitted successfully due to collision in half-duplex transmission. These packets are retransmitted immediately after the collision. That is, D0-2 to be transmitted at 1921 and D0-3 to be transmitted at 1922 are retransmitted after collision detection. As is the case with transmit suspension by the pause signal, transmission of the priority data packets is delayed by this retransmission and completed at 1924. As the period between the completion timing at 1924 and transmit start time of the next matrix (1925) is short, less number of the error correction packets are transmitted during 1926 (in 1910, P0-2 and P0-3 are not transmitted), thereby to prevent from having an effect on transmission schedule of the next matrix.

The transmit packet control part 1002 of the fifth embodiment has a counter for counting the number of transmitted packets and a timer for managing time. The timer can be easily realized by using a counter. By use of them, the transmit packet control part 1002 detects delay in transmission due to the pause signal and collision. In the case where delay occurs in transmission schedule, the transmit packet control part 1002 calculates the number of error correction packets that can be transmitted during remaining time of the period allocated to the matrix concerned and notifies it to the priority packet generating part 1000 through a path 1109. The priority packet generating part 1000 transfers only the notified number of error correction packets by thinning out error correction packets to be transmitted.

On the other hand, in the case where transmitted priority data packets are received normally without packet abandonment or bit error, transmission of high-quality priority data is completed without any problem. Alternatively, even in the case where packet abandonment or bit error occurs, unless the total numbers of the error correction packets untransmitted by being thinned out at the transmit terminal and the packets abandoned in the network or the packets with bit error exceed the error correction capability (4 packets in total in the example of FIG. 9), the disappearance can be corrected by the received packets and therefore, priority data can be reproduced completely.

As described above, according to the present invention, even when transmission schedule of the transmit packet is delayed due to the pause signal or collision, the transmission schedule can be recovered to normal state without suspending transmission of the priority data packet. Moreover, as error correction can be achieved to some extent at the receive terminal, the present invention has an effect of enabling high-quality data transmission.

Further, in this embodiment, although the number of thinned out error correction packets is determined on the basis of time required to process the matrix, it may be determined on the basis of video frame period. That is, in the case where transmission schedule of the priority packets to be transmitted within a predetermined time is delayed, error correction packets to be transmitted are thinned out without suspending transmission of the priority data packet. This can achieve a similar effect to that in the above-mentioned embodiment. The above-mentioned predetermined time can be set arbitrarily and is not limited to any specific time unit.

FIG. 10 illustrates the case where there is little transmission interval between consecutive packets (spare time of packet transmission). In the case where there is sufficiently long interval, when transmission schedule is delayed, the transmission schedule can be recovered by shortening the packet transmission interval. However, when the pause period is long or collision occurs frequently, the transmission schedule can be delayed. As such situation leads to the state as shown in FIG. 10 finally, the present invention can be applied to obtain a similar effect as in the fifth embodiment. The case of sufficient transmission interval is not eliminated from the scope of the present invention.

Furthermore, the present invention is advantageous also in the case where the transmission schedule is delayed due to transmission of the non-priority packet. Therefore, it goes without saying that such case is not eliminated from the scope of the present invention.

Sixth Embodiment

A transmission apparatus and a transmission method in accordance with the sixth embodiment will be described. In the sixth embodiment, a receive system is described.

In FIG. 1, the transmission apparatus of the sixth embodiment has the receive frame processing part 1004, the receive packet selecting part 1005 and the defragment processing part 1006. In the sixth embodiment, the transmission apparatus further has the data processing monitoring part 1008 in the video signal processing part 202 in FIG. 1.

The feature of the transmission apparatus of the sixth embodiment is to suspend defragment processing the packet, processing of which has been finished in the application and which need not be defragmented, among the packets under defragment processing and to abandon the packet.

In this embodiment, error correction matrix of the fifth embodiment as illustrated in FIG. 9 is used as processing unit of the application. However, processing unit is not limited to it.

The priority packet 9001 in FIG. 9 is received as a form of the ethernet frame to which UDP/IP and ethernet headers are added as shown in FIG. 8. The transmission apparatus (receive apparatus) utilizes the IP packet header 8201 (FIG. 8) of the ethernet frame. Generally, at transmission side, the value of the ID 8004 is added consecutively and transmitted.

As an example, assuming that the ID 8004 of the ethernet frame that constitutes a certain error correction matrix is 1000, 1001, 1002 . . . 1052, 1053.

Defragment processing in normal state is same as the method described in the fourth embodiment.

The received ethernet frame is processed in the receive frame processing part 1004 and transferred to the receive packet sorting part 1005. In the case where the priority packet is fragmented, the fragmented packet is transferred from the receive packet sorting part 1005 to the defragment processing part 1006 for defragment processing, returned to the form of the priority packet 9001 and output to the video signal processing part 202 as the priority data output 1108. At this time, in this embodiment, the ID 8004 added to the packet is also transferred simultaneously to the video signal processing part 202.

Processing of the error correction matrix 9000 shown in FIG. 9 is carried out in the video signal processing part 202 in FIG. 2. The priority data processing monitoring part 1008 monitors the ID 8004 of the error correction matrix that is currently under process in the video signal processing part 202.

When the video signal processing part 202 finishes error correction processing, the priority data processing monitoring part 1008 keeps track of the ID 8004 of the final packet of packets constituting the error correction matrix (hereinafter referred to as "final ID"). Even when the final packet is abandoned, as the number of packets constituting the error correction matrix is predetermined, the priority data processing monitoring part 1008 can find the ID 8004 of the final packet by calculation.

When error correction processing is finished, it no longer becomes necessary to perform defragment processing of the packets constituting the error correction matrix. Therefore, when the video signal processing part 202 finishes error correction processing, the defragment processing part 1006 finishes defragment processing of the priority packets belonging to the matrix. Even if defragment processing is finished, application such as video has no operational problem. As the memory for defragment secured by the defragment processing part 1006 can be released, resources are used effectively.

Similarly, the receive packet sorting part 1005 abandons the packet belonging to the error correction processing matrix that arrives late after completion of error correction processing as being unnecessary.

Specific processing will be described. The priority data processing monitoring part 1008 notifies the receive packet sorting part 1005 of the final ID as a priority data processing completion notice 1110. The receive packet sorting part 1005 instructs the defragment processing part 1006 to abandon the packet belonging to the matrix. At the same time, the receive packet sorting part 1005 stores the final ID, inspects the ID 8004 of the newly received receive packet 1107, and abandons the packet determined to belong to the error correction matrix error correction processing of which has already finished. As a result, unnecessary defragment processing of the priority packet that arrives late and processing since defragment are not conducted.

As described above, the transmission apparatus of the present invention suspends, defragment processing of the packet belonging to the packet group processing of which has been finished (error correction processing in this embodiment) and abandons the packet as well as the packets received late that belongs to the packet group. This contributes to provide an inexpensive and simple apparatus with low power consumption, which is capable of performing efficient defragment processing and reducing resources such as memory In addition, non-defragmented packets are also abandoned at the time of abandonment of delayed packets, the effect is further enhanced.

ID of the IP packet header consists of 16 bits. The period during which 16 bits make a round (period during which it is incremented from 0 to 0xFFFF sequentially and overflows and then returns to 0) is rather long for the application and enough to be used as a time reference of processing termination.

In the case where the non-priority packet is transferred among packets constituting one matrix, it consumes one ID. However, the proportion of non-priority packets is small in relation to that of priority packets. Only when the non-priority packet is transmitted immediately before the final priority packet constituting the error correction matrix and the final priority packet is too late for error correction processing, deviation occurs in the final ID of the error correction matrix processing of which has been finished. However, the probability of occurrence is substantially very low. In this case, as the deviation has an effect on only the final packet constituting the error correction matrix, there is substantially no influence.

In this embodiment, ID of the IP packet is used as information for grasping progress of processing of the application. However, the information is not limited to the ID. For example, identifier of other protocol may be utilized. The application may add unique identifier. The present invention can be performed according to these methods. These methods are not eliminated from the scope of the present invention.

As described above, the present invention can be conducted.

In the first to sixth embodiments, ethernet is taken as an example of communication network protocol, but it is not limited to ethernet. The case of using IP protocol in airwave such as satellite broadcasting and ground-wave digital broadcasting or wireless LAN such as IEEE802.11 is included in the scope of the present invention.

In the first to sixth embodiments, there are priority packets of one type. However, the present invention includes the case where there are priority packets of plural types.

It goes without saying that the method by using the processor as described in the first and third embodiments are practicable according to the other inventions.

In FIG. 1, as a matter of course, in processing of generating the priority packet in the priority packet generating part 1000 and processing of separating the receive packet in the receive packet sorting part 1005, protocol processing is performed simultaneously, not layer by layer.

In the embodiments, as examples of video signal processing, compression and expansion of image are conducted. However, the processing is not limited to compression and expansion of image and the present invention includes a transmission apparatus in which compression or expansion is not conducted. Further, the case where video data compressed by the MPEG method and the like is input is included in the scope of the present invention.

Real-time data such as audio other than video, or any data to be transmitted or received by priority is included in the technical scope of the present invention. The present invention is especially effective in the case of transmitting or receiving a large volume of data by priority.

The first to fifth embodiments use CBR video signal as an example. However, the priority data is not limited to CBR video signal.

In the embodiments, ethernet is used. In the case of using communication network other than ethernet, the transmit frame processing part 1003 and the receive frame processing part 1004 in FIG. 1 are unnecessary or replaced with other transmit processing part or receive processing part.

In the present invention, when the priority packet is processed by hardware and the non-priority packet is processed by CPU, the greatest effect can be obtained. However, the present invention is not limited to this, a dedicated processor may be adopted if it can process the priority packet in time.

In processing at receive side of the present invention, in the case where length of the priority packet is known in advance, information on packet length may be used as a criteria of determining priority packet/non-priority packet. For example, in the case where length of the receive packet exceeds that of the priority packet in defragment processing, the receive packet can be determined as the non-priority packet.

According to the present invention described in the first embodiment, transmission of the priority packet and the non-priority packet can be controlled on a clock basis. This ensures real-time communication and high-quality transmission, as well as t high-quality transmission of the non-priority packet, thereby to enable stable system operation.

As protocol processing of data requiring real-time characteristics, such as video signal, is conducted by hardware without depending on the CPU, delay in processing never occurs. All packets are transmitted completely and high-quality transmission with real-time characteristic can be ensured.

As transmission timing (transmission proportion) of the priority packet and the non-priority packet is controlled by hardware, not software, it can be completely controlled on a clock basis. All priority packets are transmitted completely and high-quality transmission with real-time characteristic can be ensured. Moreover, shaping is accurately conducted on a clock basis by hardware processing, thereby to enable high-quality communication with a very low probability of occurrence of packet abandonment in the first stage router.

As transmission proportion and transmission timing can be adjusted flexibly, time zone can be utilized efficiently. As a result, it becomes possible to transmit data in various applications with low delay, thereby to enable high-quality transmission of application data such as video and audio data that allows only low delay. In particular, audio data is sensitive to delay and therefore the present invention achieves a great effect.

In the case of transmitting a large volume of data by priority in addition to real-time transmission, reliable and high-quality transmission can be ensured.

According to the present invention described in the second embodiment, the above-mentioned effects can be obtained. Further, by flexibly acquiring header information required to generate the priority packet by the processor and setting the acquired parameter at the side of processing the priority packet, communication with many points can be conducted flexibly.

According to the present invention described in the third embodiment, in the protocol layer constituting the receive frame (protocol layer 1), it is determined whether the received packet is the priority packet or the non-priority packet by inspecting the protocol layer upper than the protocol layer 1 (protocol layer 2). The priority packet is subject to termination processing of the protocol layer 2 and the non-priority packet is transferred as it is in the protocol layer to the non-priority packet processing part. The priority packet is subject to special processing, thereby to prevent abandonment of the receive packet and due to high-speed processing, real-time characteristic can be ensured. Further, in transmitting a large volume of data, no abandonment of packet occurs, enabling high-quality transmission. Furthermore, as the non-priority packet, independently of the priority packet, is also processed by the processor, transmission quality is ensured and stable system operation can be achieved.

According to the present invention described in the fourth embodiment, the transmission apparatus comprises plural defragment processing part of the priority packet and the non-priority packet. The transmission apparatus determines whether the fragmented packet is the priority packet or the non-priority packet and defragments the determined packet in the corresponding defragment processing part. Defragment processing the non-priority packet does not prevent processing of the priority packet. By performing defragment processing of the priority packet in the dedicated processing part, it is possible to ensure real-time characteristic and conduct high-quality transmission of video, audio and so on.

On the other hand, as defragment processing of the non-priority packet is performed independently of the priority packet, is also processed by the processor, high-quality transmission and stable system operation can be achieved.

According to the present invention described in the fifth embodiment, even when transmission schedule of the transmit packet is delayed due to the pause signal and collision, the transmission schedule can be recovered to normal state without suspending transmission of the priority data packet. Moreover, as error correction can be achieved to some extent at the receive terminal, the present invention has an effect of enabling high-quality data transmission.

According to the present invention described in the sixth embodiment, the transmission apparatus suspends defragment processing of the packet belonging to the packet group processing of which has been finished (error correction processing in this embodiment) and abandons the packets received late after the processing. This contributes to provide an inexpensive and simple apparatus with low power consumption, which is capable of performing efficient defragment processing and reducing resources such as memory In the present invention (all embodiments), as the non-priority packet is processed by software by use of the CPU as conducted conventionally, transmission of system change or management information can be addressed flexibly by addition or change of software. As a result, system status between the transmit terminal and the receive terminal, or the dedicated control terminal and transmit/receive terminal can be stably monitored at all times. This can ensure stable system operation.

As transmission quality of the non-priority packet is also ensured, setting of various parameters and start/stop of transmit/receive can be performed at high speed. This also ensures stable system operation.

As data amount of the non-priority packet is much smaller than that of the priority packet, the transmission apparatus can be configured with an inexpensive CPU, resulting in low-cost system.

An expensive CPU and a large memory are not required to perform protocol processing of the priority packet that requires high load and large transmission capacity, resulting in low-cost system.

INDUSTRIAL APPLICABILITY

The present invention is effective in providing the transmission apparatus and the transmission method in which higher-priority data (for example, video data or audio data requiring real-time characteristic) and lower-priority data are transmitted.

The invention claimed is:

1. A transmission apparatus for use in a communication network comprising:
a receive frame processing part for receiving a data frame including a priority packet to be processed by priority and a non-priority packet having a lower processing priority than said priority packet and performing receipt processing of the receive data frame;
a receive packet sorting part for sorting a receive packet included in the received data frame into said priority packet and said non-priority packet by inspecting a communication protocol header provided in a protocol layer constituting said receive packet, and separately outputting said priority packet and said non-priority packet in parallel,
a priority packet processing part for processing said sorted priority packet; and
a non-priority packet processing part for processing said sorted non-priority packet;
wherein said priority packet and said non-priority packet sorted by said receive packet sorting part are transferred in parallel to said priority packet processing part and said non-priority packet processing part, respectively;
wherein said priority packet processing part and said non-priority packet processing part are independently separated from each other, and wherein said processing of said sorted priority packet and said processing of said sorted non-priority packet are performed concurrently, and
wherein said priority packet sorted by said receive packet sorting part is subject to termination processing of said protocol layer with said communication protocol header being removed and the resultant priority data is transferred to said priority packet processing part, whereas said non-priority packet is transferred to said non-priority packet processing part without removing said communication protocol header.

2. The transmission apparatus according to claim 1, wherein said receive packet sorting part sorts said receive packet into said priority packet and said non-priority packet based on at least information by type of communication protocol stored in said receive packet.

3. The transmission apparatus according to claim 1, wherein said receive packet sorting part sorts said receive packet into said priority packet and said non-priority packet by inspecting at least a port number stored in said receive packet.

4. The transmission apparatus according to claim 1, wherein said receive packet sorting part sorts said receive packet into said priority packet and said non-priority packet by inspecting at least a flow label stored in said receive packet.

5. The transmission apparatus according to claim 1, wherein said priority packet processing part is constructed by hardware, and said non-priority packet processing part is constructed by software.

6. The transmission apparatus according to claim 1, wherein said priority packet is processed by dedicated hardware associated with said priority packet processing part, and said dedicated hardware is independent of said non-priority packet processing part.

7. The transmission apparatus according to claim 1, wherein said priority packet sorted by said receiver packet sorting part is subject to termination processing of said protocol layer with said communication protocol header concurrently being removed and the resultant priority data is transferred to said priority packet processing part.

8. The transmission apparatus according to claim 7, wherein, in the case where the receive packet is a priority packet, said receive packet sorting part concurrently analyzes a plurality of communication protocol headers provided in different upper and lower protocol layers of the receive packet and performs the termination processing for concurrently removing said communication protocol headers.

9. A transmission method for use in a communication network comprising:
- a receiving step of receiving a data frame including a priority packet to be processed by priority and a non-priority packet having a lower processing priority than said priority packet;
- a sorting step of sorting said receive packet into said priority packet and said non-priority packet by inspecting a communication protocol header provided in a protocol layer constituting said receive packet;
- a step of separately outputting said priority packet and said non-priority packet in parallel, wherein said priority packet and said non-priority packet sorted in said sorting step are transferred in parallel; and
- a processing step of separately processing said priority packet and said non-priority packet,
- wherein the processing of said priority packet and the processing of said non-priority packet are independently performed from each other, and wherein the processing of said sorted priority packet and the processing of said sorted non-priority packet are performed concurrently, and
- wherein said priority packet sorted by said receive packet sorting step is subject to termination processing of said protocol layer with said communication protocol header being removed and the resultant priority data is transferred to said priority packet processing step, whereas said non-priority packet is transferred to said non-priority packet processing step without removing said communication protocol header.

10. The transmission method according to claim 9, wherein in said sorting step, said priority packet and said non-priority packet are separated by inspecting at least communication protocol type of said communication protocol header.

11. The transmission method according to claim 9, wherein in said sorting step, said priority packet and said non-priority packet are separated by inspecting at least a port number of said communication protocol header.

12. The transmission method according to claim 9, wherein in said sorting step, said priority packet and said non-priority packet are separated by inspecting at least a flow label of said communication protocol header.

13. The transmission method according to claim 9, wherein said priority packet is processed by dedicated hardware, and the processing by said dedicated hardware is independent of the processing of said non-priority packet.

14. The transmission method according to claim 9, wherein the priority packet to be processed by priority is video data and the non-priority packet having a lower processing priority than said priority packet includes attribute information of the video data.

* * * * *

UNITED STATES PATENT AND TRADEMARK OFFICE
CERTIFICATE OF CORRECTION

PATENT NO. : 8,085,666 B2
APPLICATION NO. : 12/550026
DATED : December 27, 2011
INVENTOR(S) : Masaaki Higashida Page 1 of 1

It is certified that error appears in the above-identified patent and that said Letters Patent is hereby corrected as shown below:

On the cover page, in item (63), after "7,606,155", please add the following --, which is a National Stage of International Application No. PCT/JP2002/07993, filed on August 6, 2002--.

Signed and Sealed this
Twentieth Day of March, 2012

David J. Kappos
*Director of the United States Patent and Trademark Office*